US007724644B2

(12) United States Patent
Mitsumori

(10) Patent No.: US 7,724,644 B2
(45) Date of Patent: May 25, 2010

(54) NODE REDUNDANCY METHOD, INTERFACE CARD, INTERFACE DEVICE, NODE DEVICE, AND PACKET RING NETWORK SYSTEM

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1159 days.

(21) Appl. No.: 11/337,874

(22) Filed: Jan. 23, 2006

(65) Prior Publication Data
US 2006/0120279 A1    Jun. 8, 2006

Related U.S. Application Data

(63) Continuation of application No. PCT/JP03/11582, filed on Sep. 10, 2003.

(51) Int. Cl.
*H04J 1/16* (2006.01)
(52) U.S. Cl. ........................................ 370/216; 370/222
(58) Field of Classification Search ......... 370/216–218, 370/222–234, 254
See application file for complete search history.

(56) References Cited

U.S. PATENT DOCUMENTS

| 6,314,110 | B1 | 11/2001 | Chin et al. | |
| 7,042,835 | B1* | 5/2006 | de Boer et al. | 370/222 |
| 7,274,656 | B2* | 9/2007 | Lee et al. | 370/223 |
| 2002/0024931 | A1* | 2/2002 | Chikazawa et al. | 370/228 |
| 2003/0012129 | A1* | 1/2003 | Lee et al. | 370/216 |
| 2006/0092856 | A1* | 5/2006 | Mitsumori | 370/254 |
| 2007/0206492 | A1* | 9/2007 | Zelig et al. | 370/218 |

FOREIGN PATENT DOCUMENTS

JP    2003-143169    5/2003

OTHER PUBLICATIONS

N. Enomoto et al. Spatial Reuse on Multi-Ring Networks. IEEE, Nov. 2001, http://grouper.ieee.org/groups/802/17/documents/presentations/nov2001/hh_mrrs_01.pdf.
Medium Access Control (MAC) Parameters, Physical Layer Interface, and Management Parameters. IEEE Draft P802.17/D2.1 Feb. 14, 2003.

* cited by examiner

*Primary Examiner*—Albert T Chou
(74) *Attorney, Agent, or Firm*—Katten Muchin Rosenman LLP

(57) ABSTRACT

A network includes a plurality of redundant nodes and ordinary nodes. A first redundant node from among the redundant nodes sets a common address and setting information in a message packet and broadcasts the message packet over the network. The common address is commonly used by all the redundant nodes on the network. The setting information is indicative of the fact that the first redundant node is a redundant node. All the nodes have a topology table. The nodes that receive the message packet set in their topology table information indicating of presence of the first redundant node and the common address shared by the redundant nodes. When transmitting a packet to the first redundant node, a node sets the common address as a destination address of the packet.

19 Claims, 35 Drawing Sheets

FIG.8

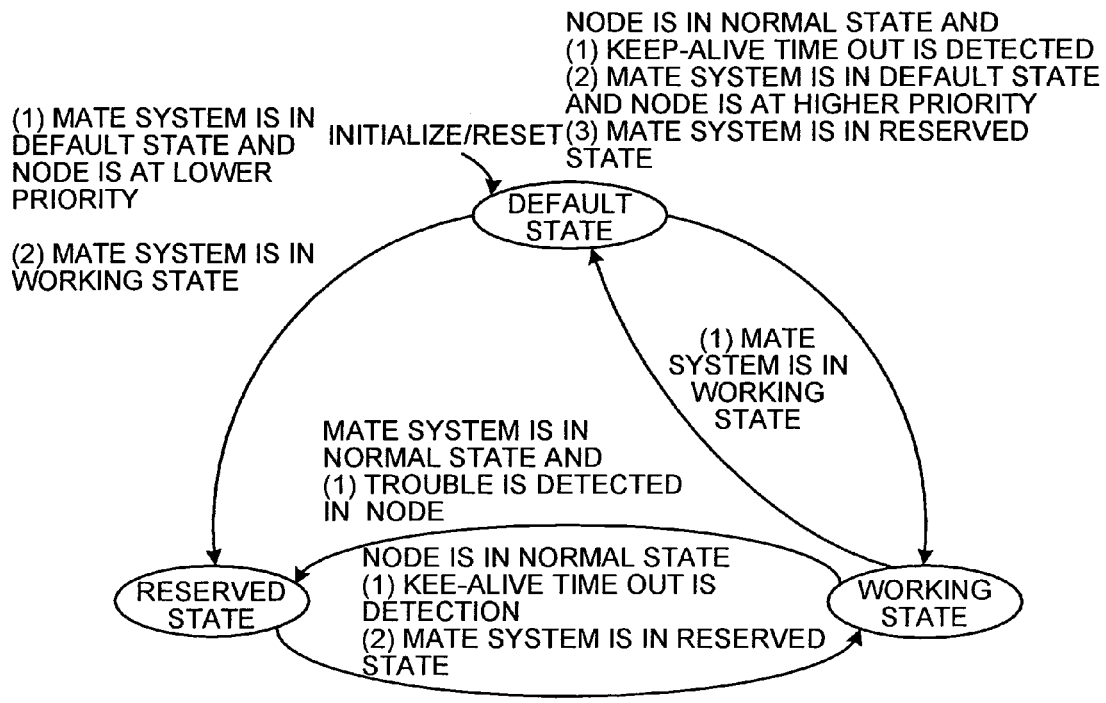

| STATE | OPERATION |
|---|---|
| DEFAULT STATE | REDUNDANT LINK IS IN BLOCKING STATE<br>KEEP-ALIVE PACKET OF "REDUNDANT NODE STATE = DEFAULT STATE" IS TRANSMITTED |
| WORKING STATE | REDUNDANT LINK IS IN FORWARDING STATE<br>KEEP-ALIVE PACKET OF "REDUNDANT NODE STATE = WORKING STATE" IS TRANSMITTED |
| RESERVED STATE | REDUNDANT LINK IS IN BLOCKING STATE<br>KEEP-ALIVE PACKET OF "REDUNDANT NODE STATUS = RESERVED STATE" IS TRANSMITTED |

FIG.9

| NODE ADDRESS | REDUNDANT NODE ENABLE | NUMBER OF HOPS IN INNER LOOP | NUMBER OF HOPS IN OUTER LOOP | SELECTION OF INNER LOOP PATH | SELECTION OF OUTER LOOP PATH |
|---|---|---|---|---|---|
| #A | OFF | 0 | 0 | OFF | OFF |
| #B | OFF | 1 | 5 | ON | OFF |
| #C | ON | 2 | 4 | ON | OFF |
| #D | OFF | 3 | 3 | ON | OFF |
| #E | ON | 4 | 2 | OFF | ON |
| #F | OFF | 5 | 1 | OFF | ON |
| #T | - | 6 | 6 | ON | OFF |

FIG.11

| NODE ADDRESS | REDUNDANT NODE ENABLE | NUMBER OF HOPS IN INNER LOOP | NUMBER OF HOPS IN OUTER LOOP | SELECTION OF INNER LOOP PATH | SELECTION OF OUTER LOOP PATH |
|---|---|---|---|---|---|
| #A | OFF | 0 | 0 | OFF | OFF |
| #B | OFF | 1 | 5 | ON | OFF |
| #C | ON | 2 | 4 | ON | OFF |
| #D | OFF | 3 | 3 | ON | OFF |
| #E | ON | 4 | 2 | OFF | ON |
| #F | OFF | 5 | 1 | OFF | ON |
| #T | - | 4 | 4 | ON | OFF |

FIG.13

| NODE ADDRESS | REDUNDANT NODE ENABLE | NUMBER OF HOPS IN INNER LOOP | NUMBER OF HOPS IN OUTER LOOP | SELECTION OF INNER LOOP PATH | SELECTION OF OUTER LOOP PATH |
|---|---|---|---|---|---|
| #A | OFF | 0 | 0 | OFF | OFF |
| #B | OFF | 1 | 5 | ON | OFF |
| #C | ON | 2 | 4 | ON | OFF |
| #D | OFF | 3 | 3 | ON | OFF |
| #E | ON | 4 | 2 | OFF | ON |
| #F | OFF | 5 | 1 | OFF | ON |
| #T | - | 2 | 2 | ON | ON |

FIG.17

| NODE ADDRESS | REDUNDANT NODE ENABLE | REDUNDANCY GROUP ID | NUMBER OF HOPS IN INNER LOOP | NUMBER OF HOPS IN OUTER LOOP | SELECTION OF INNER LOOP PATH | SELECTION OF OUTER LOOP PATH |
|---|---|---|---|---|---|---|
| #11A | OFF | - | 0 | 0 | OFF | OFF |
| #11B | OFF | - | 1 | 9 | OFF | OFF |
| #11C | ON | 1 | 2 | 8 | OFF | OFF |
| #11D | ON | 1 | 3 | 7 | OFF | OFF |
| #11E | OFF | - | 4 | 6 | OFF | OFF |
| #11F | OFF | - | 5 | 5 | OFF | OFF |
| #11G | OFF | - | 6 | 4 | OFF | OFF |
| #11H | ON | 2 | 7 | 3 | OFF | OFF |
| #11I | ON | 2 | 8 | 2 | OFF | OFF |
| #11J | OFF | - | 9 | 1 | OFF | OFF |
| #S | - | - | 3 | 8 | ON | OFF |
| #T | - | - | 8 | 3 | OFF | ON |

FIG.19

| NODE ADDRESS | REDUNDANT NODE ENABLE | REDUNDANCY GROUP ID | NUMBER OF HOPS IN INNER LOOP | NUMBER OF HOPS IN OUTER LOOP | SELECTION OF INNER LOOP PATH | SELECTION OF OUTER LOOP PATH |
|---|---|---|---|---|---|---|
| #11A | OFF | - | 0 | 0 | OFF | OFF |
| #11B | OFF | - | 1 | 9 | OFF | OFF |
| #11C | ON | 1 | 2 | 8 | OFF | OFF |
| #11D | ON | 1,2 | 3 | 7 | OFF | OFF |
| #11E | OFF | - | 4 | 6 | OFF | OFF |
| #11F | OFF | - | 5 | 5 | OFF | OFF |
| #11G | OFF | - | 6 | 4 | OFF | OFF |
| #11H | OFF | - | 7 | 3 | OFF | OFF |
| #11I | ON | 2 | 8 | 2 | OFF | OFF |
| #11J | OFF | - | 9 | 1 | OFF | OFF |
| #S | - | - | 3 | 8 | ON | OFF |
| #T | - | - | 8 | 7 | ON | ON |

FIG.29

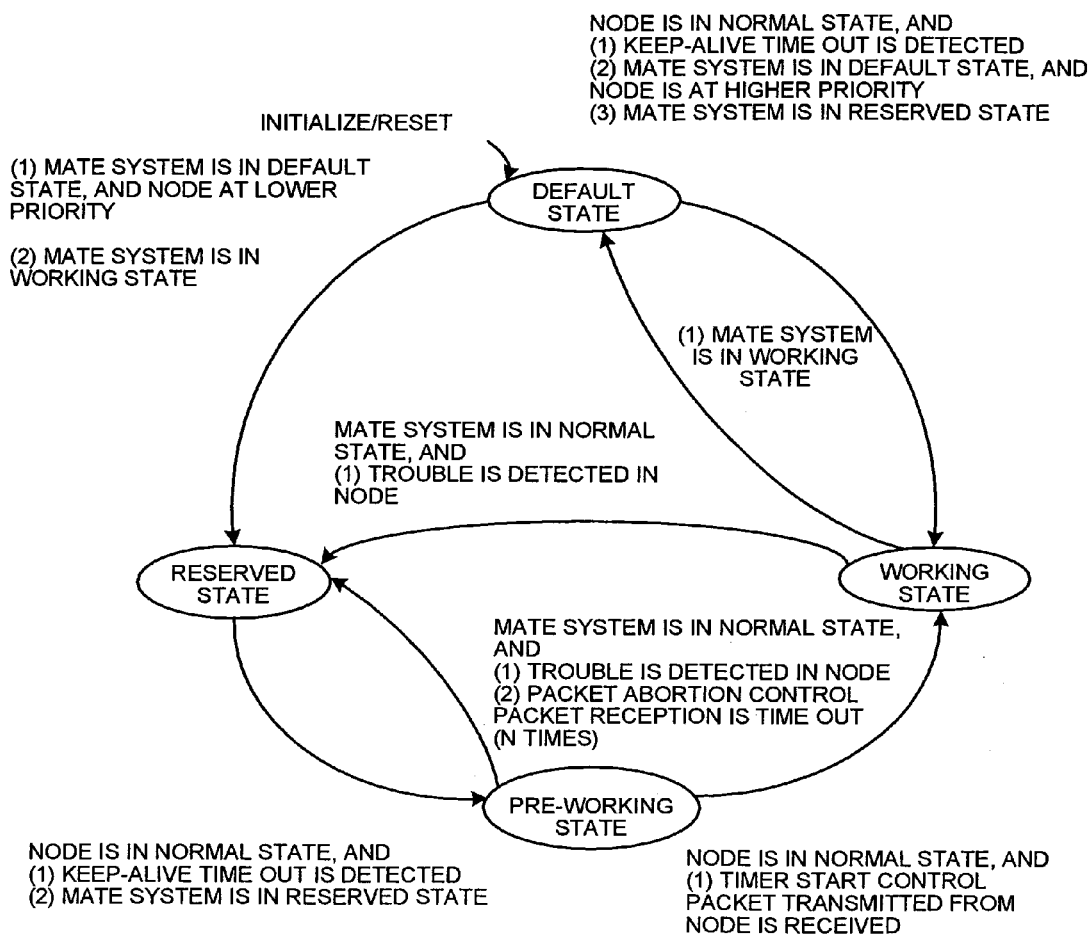

| STATE | OPERATIONS |
|---|---|
| DEFAULT STATE | REDUNDANT PATH AND RING PATH ARE IN BLOCKING STATE."KEEP-ALIVE PACKET OF "REDUNDANT NODE STATE = DEFAULT STATE" IS TRANSMITTED |
| WORKING STATE | REDUNDANT PATH AND RING PATH ARE IN FORWARDING STATE KEEP-ALIVE PACKET OF "REDUNDANT NODE STATE = WORKING STATE" IS TRANSMITTED |
| RESERVED STATE | REDUNDANT PATH AND RING PATH ARE IN BLOCKING STATE KEEP-ALIVE PACKET OF "REDUNDANT NODE STATE = RESERVED STATE" IS TRANSMITTED |
| PRE-WORKING STATE | REDUNDANT PATH AND RING PATH ARE IN FORWARDING STATE KEEP-ALIVE PACKET TRANSMISSION OF "REDUNDANT NODE STATE=PRE-WORKING STATE" IS TRANSMITTED TIMER START CONTROL PACKET IS TRANSMITTED |

FIG.30

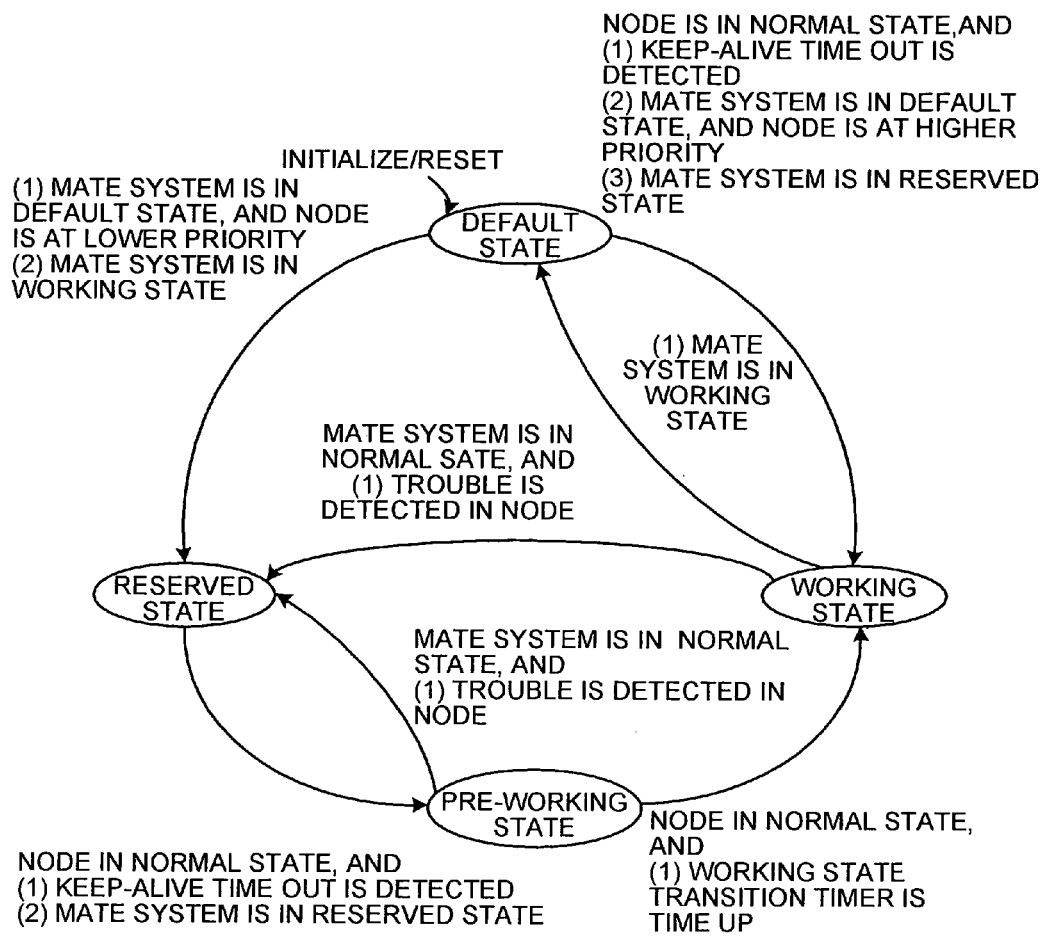

| STATE | OPERATIONS |
|---|---|
| DEFAULT STATE | REDUNDANT PATH AND RING PATH ARE IN BLOCKING STATE KEEP-ALIVE PACKET OF "REDUNDANT NODE STATUS = DEFAULT STATE" IS TRANSMITTED |
| WORKING STATE | REDUNDANT PATH AND RING PATH ARE IN FORWARDING STATE KEEP-ALIVE PACKET OF "REDUNDANT NODE STATUS = WORKING STATE" IS TRANSMITTED |
| RESERVED STATE | REDUNDANT PATH AND RING PATH ARE IN BLOCKING STATE KEEP-ALIVE PACKET OF "REDUNDANT NODE STATUS = RESERVED STATE" IS TRANSMITTED |
| PRE-WORKING STATE | REDUNDANT PATH AND RING PATH ARE IN BLOCKING STATE KEEP-ALIVE PACKET OF "REDUNDANT NODE STATUS =PRE-WORKING STATE" IS TRANSMITTED |

FIG.31

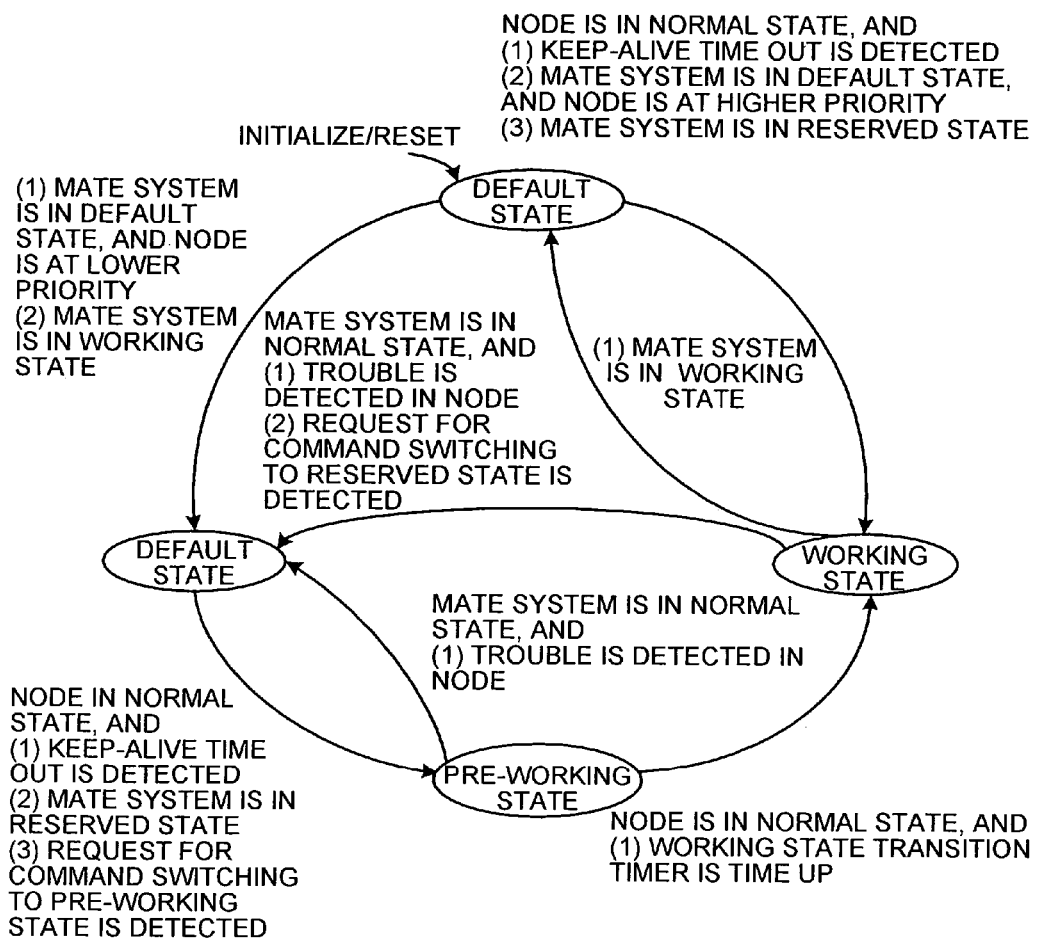

| STATE | OPERATIONS |
|---|---|
| DEFAULT STATE | REDUNDANT PATH AND RING PATH ARE IN BLOCKING STATE KEEP-ALIVE PACKET OF "REDUNDANT NODE STATUS = DEFAULT STATE" IS TRANSMITTED |
| WORKING STATE | REDUNDANT PATH AND RING PATH ARE IN FORWARDING STATE "KEEP-ALIVE PACKET OF "REDUNDANT NODE STATUS = WORKING STATE" IS TRANSMITTED |
| RESERVED STATE | REDUNDANT PATH AND RING PATH ARE IN BLOCKING STATE KEEP-ALIVE PACKET OF "REDUNDANT NODE STATUS = RESERVED STATE" IS TRANSMITTED |
| PRE-WORKING STATE | REDUNDANT PATH AND RING PATH ARE IN BLOCKING STATE KEEP-ALIVE PACKET OF "REDUNDANT NODE STATUS = PRE-WORKING STATE" IS TRANSMITTED |

FIG.32

| NODE ADDRESS | REDUNDANT NODE ENABLE | REDUNDANT NODE STATE | REDUNDANCY GROUP ID | NUMBER OF HOPS IN INNER LOOP | NUMBER OF HOPS IN OUTER LOOP | SELECTION OF INNER LOOP PATH | SELECTION OF OUTER LOOP PATH |
|---|---|---|---|---|---|---|---|
| #A | OFF | - | - | 0 | 0 | OFF | OFF |
| #B | OFF | - | - | 1 | 9 | OFF | OFF |
| #C | ON | RESERVED STATE | 1 | 2 | 8 | OFF | OFF |
| #D | ON | WORKING STATE | 1 | 3 | 7 | OFF | OFF |
| #E | OFF | - | - | 4 | 6 | OFF | OFF |
| #F | OFF | - | - | 5 | 5 | OFF | OFF |
| #G | OFF | - | - | 6 | 4 | OFF | OFF |
| #H | ON | WORKING STATE | 2 | 7 | 3 | OFF | OFF |
| #I | ON | RESERVED STATE | 2 | 8 | 2 | OFF | OFF |
| #J | OFF | - | - | 9 | 1 | OFF | OFF |
| #S | - | - | - | 3 | 8 | ON | OFF |
| #T | - | - | - | 8 | 3 | OFF | ON |

NODE REDUNDANCY METHOD, INTERFACE CARD, INTERFACE DEVICE, NODE DEVICE, AND PACKET RING NETWORK SYSTEM

CROSS-REFERENCE TO RELATED APPLICATION

This application is a continuation of International Application PCT/JP2003/011582 filed on Sep. 10, 2003, now International Publication WO 2005/027427, the contents of which are herein wholly incorporated by reference.

BACKGROUND OF THE INVENTION

1. Field of the Invention

The present invention relates to a node redundancy method, an interface card, an interface device, a node device, and a packet ring network system used in networks.

2. Description of the Related Art

Recently, there has been a remarkable increase in data traffics over the Internet mainly based on the Ethernet (Registered trade name) or IP (Internet Protocol) packets, rapid increase in ADSL (Asymmetric Digital Subscriber Line) users, and advent of VoIP (Voice over IP) technique. As a result, a network of packet rings (described as a packet ring network or simply, as a ring hereinafter), in which packets are directly processed on the ring network for band management for each packet or for statistic multieffect, has attracted attention as a potential alternative for a ring network based on the conventional SONET/SDH (Synchronous Optical Network/Synchronous Digital Hierarchy) devices.

Especially, the packet ring network is attracting high attentions as useful in networks in urban areas. In the IEEE, the work for standardizing the IEEE802.17 RPR, in which standard specifications for a packet ring are put into shape, are now in progress with November, 2003 as a target deadline.

The recent packet ring as described above is generally referred to as an RPR (Resilient Packet Ring) to differentiate it from the token ring or FDDI (Fiber Distributed Data Interface) ring.

The RPR is a network protocol technique mainly provided for an inter-city network (MAN/WAN (Metropolitan Area Network/Wide Area Network)).

The RPR is based on the SRP (Spatial Reuse Protocol) announced by Cisco Systems, Inc., and has the following features:

1. Support for an interactive dual ring network.
2. Support for an MAC (Media Access Control) layer (layer 2)
3. High utilization factor of a used band
4. Plug & Play
5. Capability of switching within 50 ms at occurrence of trouble.

FIG. 35 is a schematic of a conventional RPR network 10. The RPR network 10 includes node devices #a to #f connected to each other to form a duel ring of an inner loop communication path 11i and an outer loop communication path 11o. The inner loop communication path 11i and the outer loop communication path 11o allow bilateral communications in the RPR network 10. Because of the dual ring configuration, even when trouble occurs in one of the rings, communications can be continued via the other ring.

The nodes devices #a to #f are devices for transferring packet data and they function as nodes. The nodes devices #a to #f can be, for instance, a transfer device, a bridge node, a router, server, and any other device dedicated to the RPR.

A packet-based network such as Ethernet typically has the shoe-type or tree-type network. When node redundancy is to be built in the packet-based network as described above, generally the STP (Spanning Tree Protocol) is employed.

Patent document 1: U.S. Pat. No. 6,314,110

Non-patent document 1: IEEE802.17 Draft V2.1

In the conventional technology, when node redundancy is realized with a mesh-formed or a tree-type network, a number of optical fibers are disadvantageously required to be installed anew for connecting the node devices to the redundant node devices.

With the redundant node configuration using the STP, about one minute is required for switching to a bypass route when line trouble or node trouble occurs, and the requirement of telecommunications operators and the like for the high speed switching with the time of 50 milliseconds or below has not been satisfied at all.

Recently, the possibility of RSTP (Rapid Spanning Tree Protocol) developed by improving the STP has been examined, but sill the switching time of several seconds is required even when the RSTP is employed, and the requirement for the switching time of 50 milliseconds or below has not been realized.

The standard RPR (IEEE802.17 draft V2.1) for the conventional type of RPR network does not include any definition on a function for node redundancy. Moreover, the IETF RFC 2892 (The Cisco SRP MAC Layer Protocol) does not include any definition on node redundancy in a ring network.

SUMMARY OF THE INVENTION

It is an object of the present invention to at least solve the problems in the conventional technology.

According to an aspect of the present invention, a node redundancy method applied to a packet ring network having a plurality of nodes and a plurality of redundant nodes, the redundant nodes including first redundant node and at least one second redundant node including the first redundant node setting in a message packet a common address and setting information, and broadcast-transmitting the message packet over the packet ring network, wherein the common address is an address that is commonly used with the second redundant node, and setting information is information indicative of the fact that the first redundant node is a redundant node; the second redundant node receiving the message packet and setting in a ring topology table existence information and the common address, wherein the existence information in information indicative of existence of the first redundant node in the packet ring network; and a node from among the nodes, when receiving a packet destined to a redundant node, setting the common address as a destination address in the packet and transmitting the packet to the packet ring network.

According to another aspect of the present invention, an interface card has a configuration that can realize a node redundancy method according to the above aspect.

According to still another aspect of the present invention, an interface device has a configuration that can realize a node redundancy method according to the above aspect.

According to still another aspect of the present invention, a node device provided on a packet ring network including a plurality of nodes and at least one redundant node includes a setting unit that receives a message packet with information concerning a redundant node setting set by the nodes and sets information in a ring topology table indicative of existence of the redundant node and a common address commonly used with other redundant node on the packet ring network; and a transmitting unit that sets the common address as a destination address of the packet when a packet addressed to a redundant node is transmitted and transmits the packet to the packet ring network.

According to still another aspect of the present invention, a packet ring network system with a redundant node provided thereon includes a first transmitting unit that sets, by a node provided as a redundant node, a common address commonly used with other redundant node on the packet ring network and information concerning redundant node setting indicating that a node itself is set as a redundant node, and broadcasts the message packet to the packet ring network; a setting unit that sets, by each node on the packet ring network having received the message packet, existence of a redundant node on a ring topology table within the node itself and the common address; and a second transmitting unit that sets the common address as an address of a packet addressed to a redundant node and transmits the packet to the packet ring network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic of a format of a keep alive packet;

FIG. 9 is a schematic of a ring topology table according to the first embodiment;

FIG. 11 is a ring topology table used in a first variant of the first embodiment;

FIG. 13 is a ring topology table used in a second variant of the first embodiment;

FIG. 17 is a ring topology table used in the second embodiment;

FIG. 19 is a ring topology table used in the third embodiment;

FIG. 29 is a state transition diagram in an eighth embodiment of the present invention;

FIG. 30 is a state transition diagram in a ninth embodiment of the present invention;

FIG. 31 is a state transition diagram in a tenth embodiment of the present invention;

FIG. 32 is a ring topology table in an eleventh embodiment of the present invention;

DETAILED DESCRIPTION OF THE PREFERRED EMBODIMENTS

Exemplary embodiments of the present invention are described below in detail with reference to the accompanying drawings.

Figure 1:
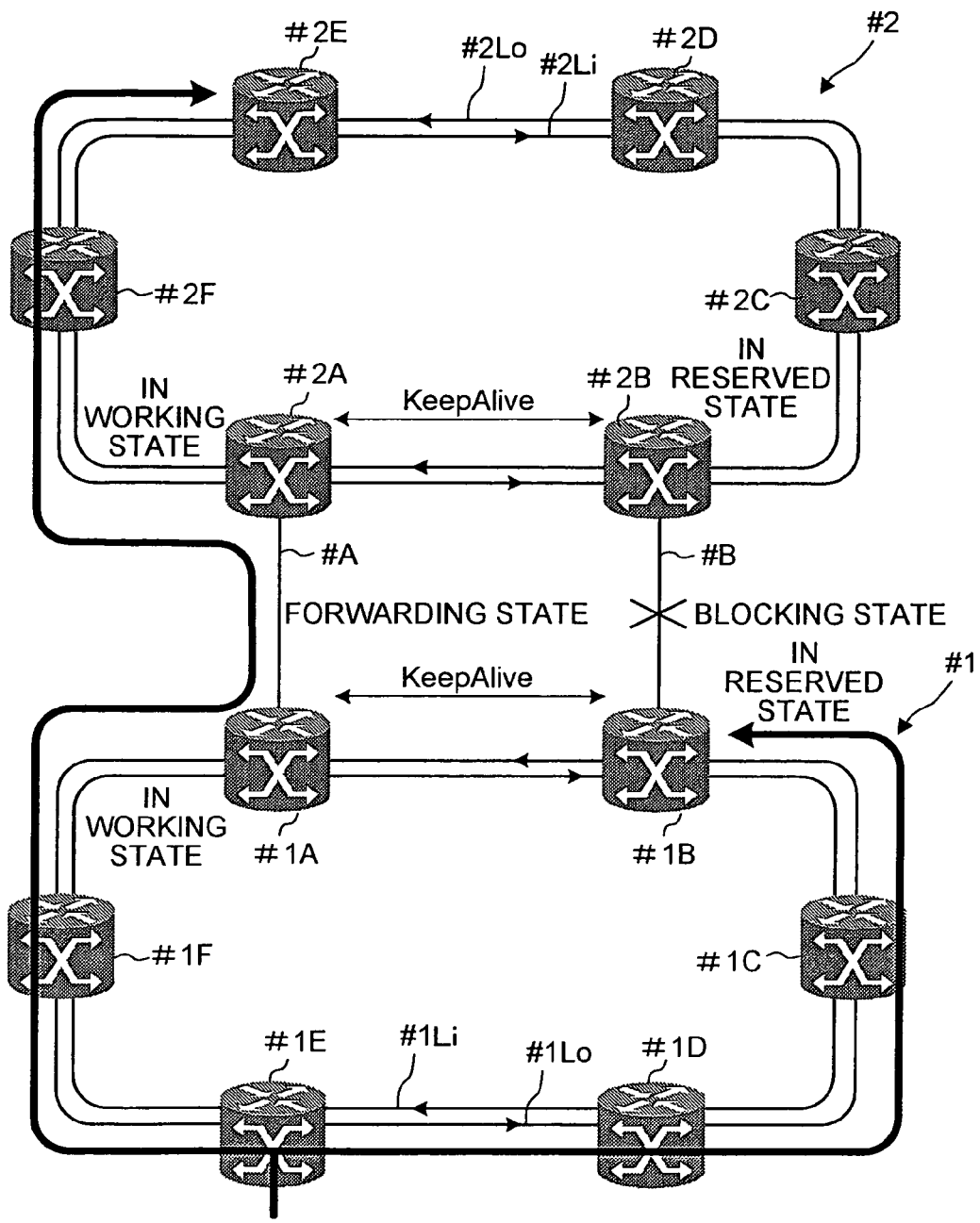
FIG. 1 is a schematic for explaining the outline of a network according to a first embodiment of the present invention.

FIG. 1 is a schematic for explaining the outline of a network according to a first embodiment of the present invention. The network includes a RPR network #1 and a RPR network #2 connected to each other with node redundancy.

The redundant node device also means a redundant node. Moreover, a node device also means a node.

The RPR network #1 includes a redundant node device #1A, a redundant node device #1B, and node devices #1C to #1F connected to each other in a ring form with an inner loop communication path #1Li and an outer loop communication path #1Lo for bilateral communications. Thus, the RPR network #1 has the dual ring configuration. As a result, even if trouble occurs in one ring, communications can be continued via other ring.

The RPR network #2 includes a redundant node device #2A, a redundant node device #2B, and node devices #2C to #2F connected to each other in a ring form with an inner loop communication path #2Li and an outer loop communication path #2Lo for bilateral communications. Thus, even the RPR network #2 has the dual ring configuration. As a result, even if trouble occurs in one ring, communications can be continued via other ring.

The RPR network #1 and the RPR network #2 are connected via a redundant link #A and a redundant link #B. The redundant link #A is connected between the redundant node device #1A of the RPR network #1 and the redundant node device #2A of the RPR network #2.

The redundant link #B is connected between the redundant node device #1B of the RPR network #1 and the redundant node device #2B of the RPR network #2.

The redundant node device #1A and the redundant node device #2A are set in a working state. In the working state, the redundant link #A is set in a forwarding state, i.e., packet data is transferred via the redundant link #A between the redundant node device #1A and the redundant node device #2A.

The redundant node device #1B and the redundant node device #2B are set in the reserved state. In the reserved state, the redundant link #B is set in a blocking state, i.e., packet data is not transferred via the redundant link #B between the redundant node device #1B and the redundant node device #2B.

Thus, in the network shown in FIG. 1, reliability of the connection between the RPR network #1 and the RPR network #2 is enhanced with redundant configuration allowing for the working state and the reserved state.

A keep-alive packet (control packet), which is also expressed as KeepAlive, is transmitted from one redundant node device to other. The recipient of the a keep-alive packet can monitor the state of the sender from the a keep-alive packet. Specifically, in the RPR network #1, the redundant node device #1A sends a keep-alive packet to the redundant node device #1B and the redundant node device #1B sends a keep-alive packet to the redundant node device #1A so that the redundant node device #1A and the redundant node device #1B can monitor other's state.

Similarly, in the RPR network #2, the redundant node device #2A sends a keep-alive packet to the redundant node device #2B and the redundant node device #2B sends a keep-alive packet to the redundant node device #2A so that the redundant node device #2A and the redundant node device #2B can monitor other's state.

Figure 2:
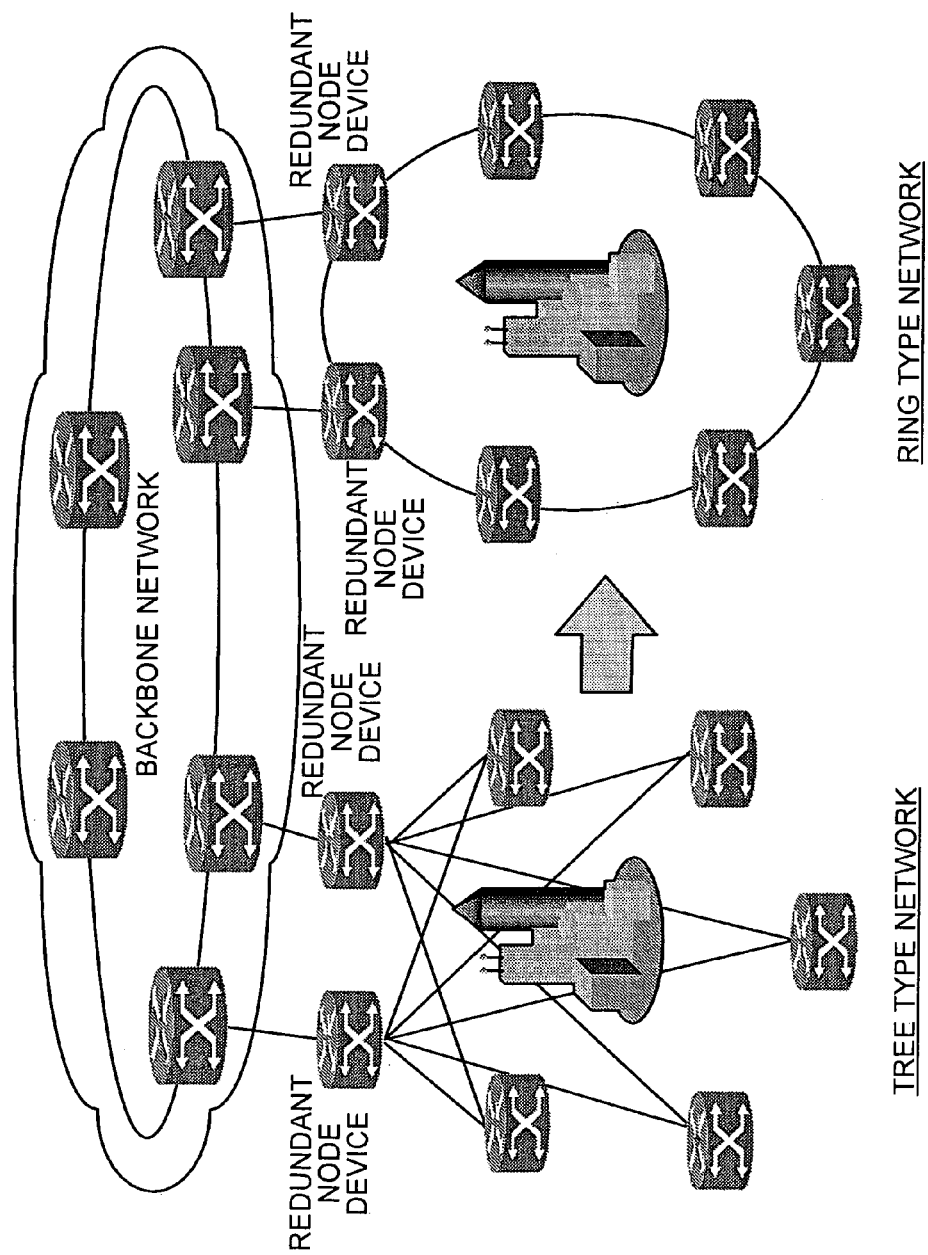
FIG. 2 is a schematic for explaining the outline of the network shown in FIG. 1.

In the first embodiment, as shown in FIG. 2, by constructing node redundancy on a ring-type network, number of optical fibers required can substantially be reduced as compared to that in a tree-type network.

Figure 3:
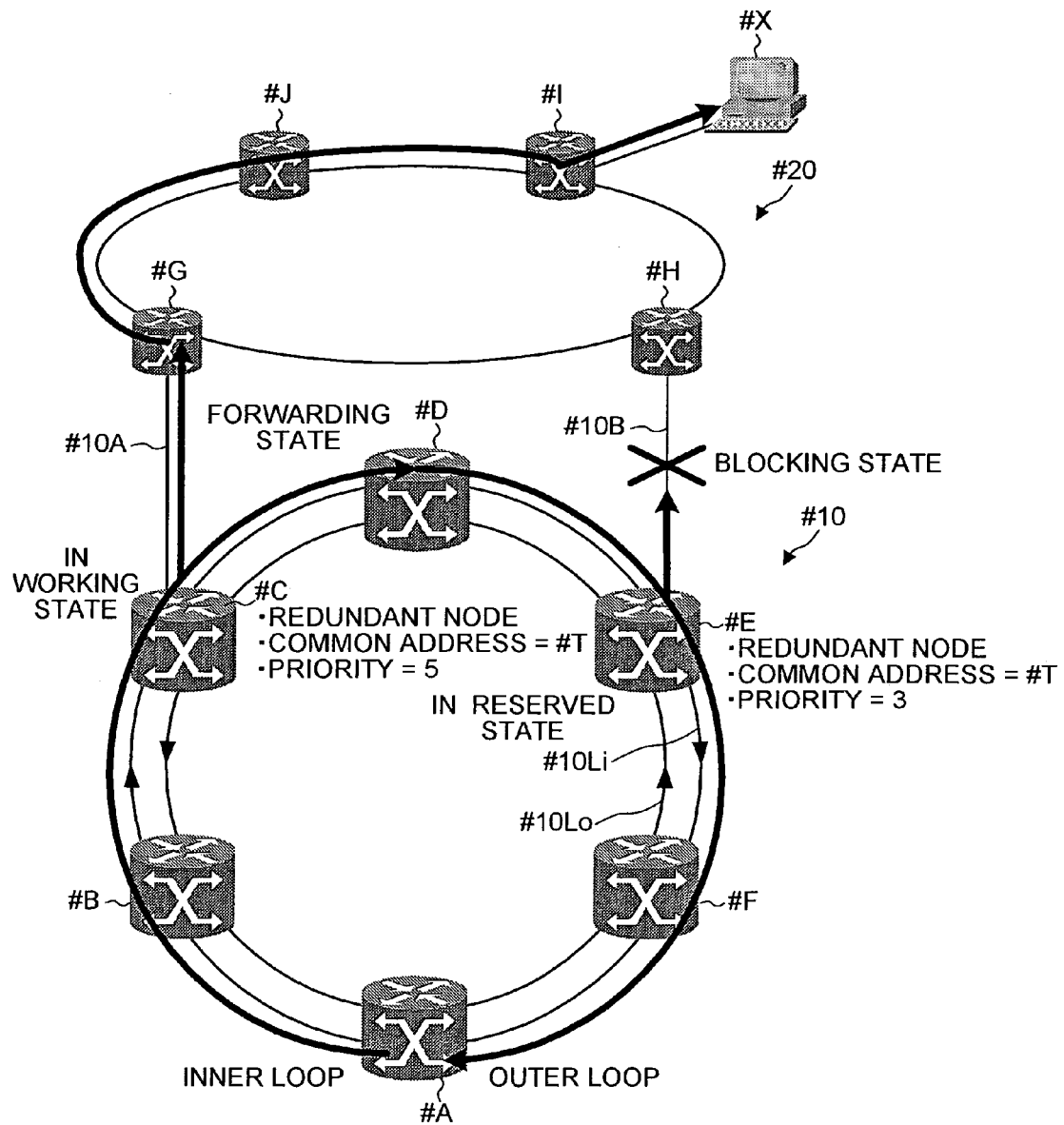
FIG. 3 is a schematic for explaining a structure of the network shown in FIG. 1.

FIG. 3 is a schematic of a specific configuration of the network according to the first embodiment. The network includes a RPR network #10 and a RPR network #20 connected to each other with the node redundancy provided.

The RPR network #10 includes a node device #A, a node device #B, a redundant node device #C, a node device #D, a redundant node device #E, and a node device #F connected to each other in a ring form with the inner loop communication path #10Li and the outer loop communication path #10Lo for bilateral communications.

Thus, the RPR network #10 has the dual ring configuration. Therefore, even if trouble occurs in one of the inner loop communication path #10Li and the outer loop communication path #10Lo, communications can be continued by re-transmitting packet data through the other communication path.

The RPR network #20 includes a redundant node device #G, a redundant node device #H, a node device #I and a node device #J connected to each other in a ring form with an inner loop communication path and an outer loop communication path (not shown) for bilateral communications.

Thus, the RPR network #20 has the dual ring configuration. Therefore, even if trouble occurs in one of the inner loop communication path and outer loop communication path, communications can be continued by re-transmitting packet data through the other communication path. A client #X is connected to the node device #I.

The RPR network #10 and the RPR network #20 are connected via two redundant links #10A and #10B. The redundant link #10A connects the redundant node device #C of the RPR network #10 and the redundant node device #G of the RPR network #20. The redundant link #10B connects the redundant node device #E of the RPR network #10 and the redundant node device #H of the RPR network #20.

The redundant node device #C and the redundant node device #G are set in the working state. In the working state, the redundant link #10A is set in the forwarding state, i.e., packet data is transferred via the redundant link #10A between the redundant node device #C and the redundant node device #G. The redundant node device #E and the redundant node device #H are in the reserved state. In the reserved system, the redundant link #10B is set in the blocking state, i.e., packet data is not transferred via the redundant link #10B between the redundant node device #E and the redundant node device #H.

Thus, reliability of the connection between the RPR network #10 and the RPR network #20 can be enhanced with redundant configuration allowing for the working state and reserved state.

A keep-alive packet (control packet), which is also referred to as KeepAlive, is transmitted each other between the redundant node devices to constantly monitor the state of the counterpart. Specifically, in the RPR network #10, keep alive-packets are transmitted from the redundant node device #C to the redundant node device #E and vice versa to monitor each other's state.

Figure 4:
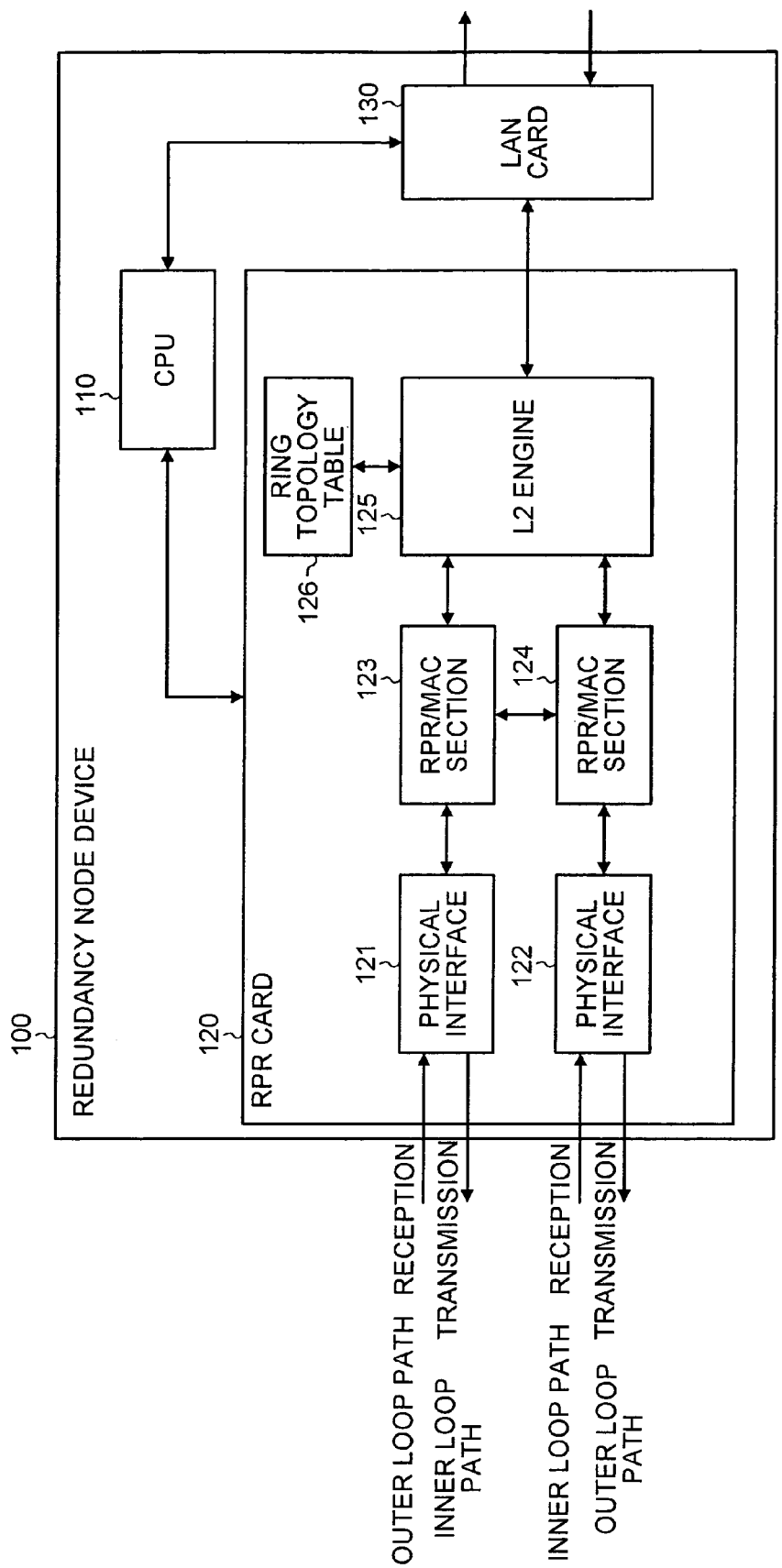
FIG. 4 is a block diagram of a redundant node device 100 according to the first embodiment.

FIG. 4 is a block diagram of a redundant node device 100 according to the first embodiment. The redundant node device 100 can be used for any of the redundant node device #C, the redundant node device #E, the redundant node device #G, and the redundant node device #H shown in FIG. 3.

In the redundant node device 100, a central processing unit (CPU) 110 controls a RPR card 120 and a LAN card 130. The RPR card 120 is connected to a ring network (for instance, the inner loop communication path #10Li and the outer loop communication path #10Lo: see FIG. 3), and has a communication interface function.

The LAN (Local Area Network) card 130 is connected to a redundant node outside the applicable RPR network via redundant links (the redundant link #10A and the redundant link #10B; see FIG. 3), and has a communication interface function. A physical interface of the LAN card 130 can be either Ethernet or SONET/SDH. Because a type of the physical interface is not particularly important, it is not specified below.

In the RPR card 120, a physical interface 121 and a physical interface 122 accommodate an inner loop communication path and an outer loop communication path (for instance, the inner loop communication path #10Li and the outer loop communication path #10Lo: see FIG. 3). Specifically, the physical interface 121 accommodates an outer route for receiving packet data and an inner route for transmitting packet data. The physical interface 122 also accommodates an inner route for receiving packet data and an outer route for transmitting packet data.

A RPR MAC section 123 and a RPR MAC section 124 convert an MAC address into the RPR format. An L2 engine 125 selects one of the RPR MAC section 123 and RPR MAC section 124 according to the MAC address of a frame to be sent out to the ring network (inner route and outer route), to pass the frame to the selected RPR MAC section.

A ring topology table 126 is used for defying the topology of the RPR network. Further, in the redundant node device 100, a card required for accommodating lines apart from a ring line and redundant links can be accommodated.

Figure 5:
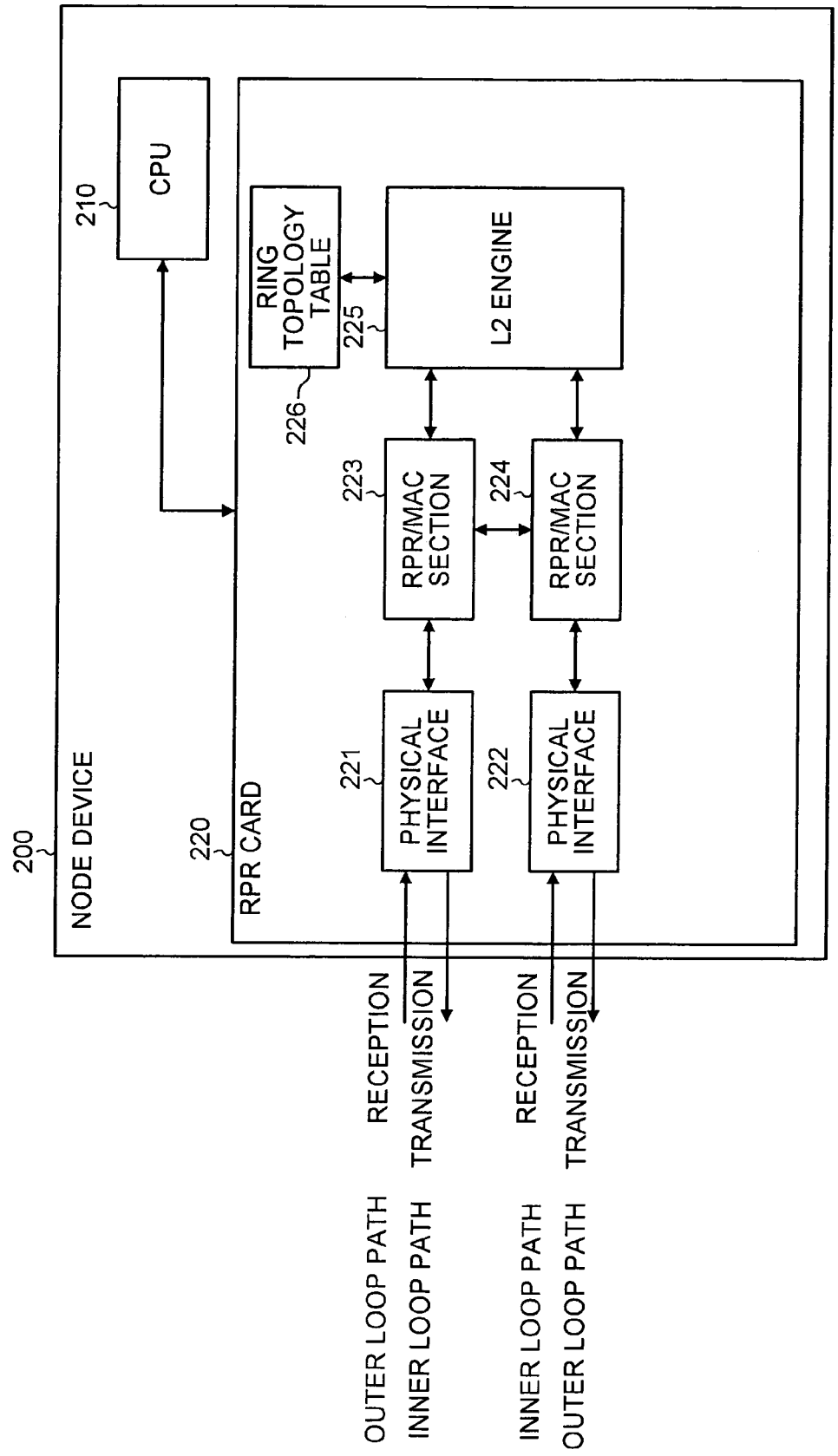
FIG. 5 is a block diagram of a redundant node device 200 according to the first embodiment.

FIG. 5 is a block diagram of a node device 200 in the first embodiment. The node device 200 can be used for any one of the node device #A, node device #B, node device #D, node device #F, node device #I, and node device #J shown in FIG. 3.

In the node device 200, a CPU 210 controls an RPR card 220. The RPR card 220 is connected to a ring network (for instance, the inner loop communication path #10Li and outer loop communication path #10Lo; Refer to FIG. 3), and has the communication interface function.

In the RPR card 220, a physical interface 221 and a physical interface 222 accommodate therein an inner loop communication path and an outer loop communication path (such as, for instance, the inner loop communication path #10Li and outer loop communication path #10Lo; Refer to FIG. 3). More specifically the physical interface 221 accommodates therein an outer loop path for receiving packet data and an inner loop path for transmitting packet data. On the other hand, the physical interface 222 accommodates therein an inner loop path for receiving packet data and an outer loop path for transmitting packet data.

An RPR/MAC section 223 and RPR/MAC section 224 convert an MAC address to an RPR format. An L2 engine 225 selects either one of the RPR/MAC section 223 and RPR/MAC section 224 according to a destination MAC address for a frame to be transmitted to the ring network (an inner loop path, an outer loop path), and delivers the frame to the selected RPR/MAC section.

A ring topology table 226 is used for defining a topology for an RPR network. Further, the node device 200 can accommodate a card required for accommodation of a line other than the ring line.

Again in FIG. 3, the following parameters (i) to (vi) are set as default values in each of redundant nodes (redundant node devices #C, #E, #G, and #H) as well as in each of node devices (node devices #A, #B, #D, #F, #I, and #J).

(i) Redundant node Enable/Disable: This parameter is set in all redundant node devices and all node devices on an RPR network and decides whether a node is a redundant node or not. Enable is set for a redundant node. Disable is set for a node which is not a redundant node.

(ii) Priority: This parameter is set only in a redundant node for which the Enable/Disable parameter is set to Enable, and decides whether a line is for current use or for spare use.

(iii) Discrete address: This parameter is set in all of redundant node devices and all of node devices on an RPR network, and is unique and discrete indicating a position of a node in the RPR network.

(iv) Common address: This parameter is set in a plurality of redundant node devices in which the redundant node Enable/Disable parameter is set to Enable (such as, for instance, the redundant node device #C and the redundant node device #E; Refer to FIG. 3), and is a common address for redundant node devices. This common address must be different from the discrete address described above.

(v) Transmission timer value: This parameter is set only in the redundant node devices in which the redundant node Enable/Disable parameter is set to Enable, and indicates a transmission interval when a keep-alive packet described below (Refer to FIG. 7) is transmitted.

(vi) Reception time-out value: This parameter is set only in the redundant node devices in which the redundant node Enable/Disable parameter is set to Enable, and determines that time for receiving a keep-alive packet from a mate redundant node device (having the common address) is out.

Figure 6:
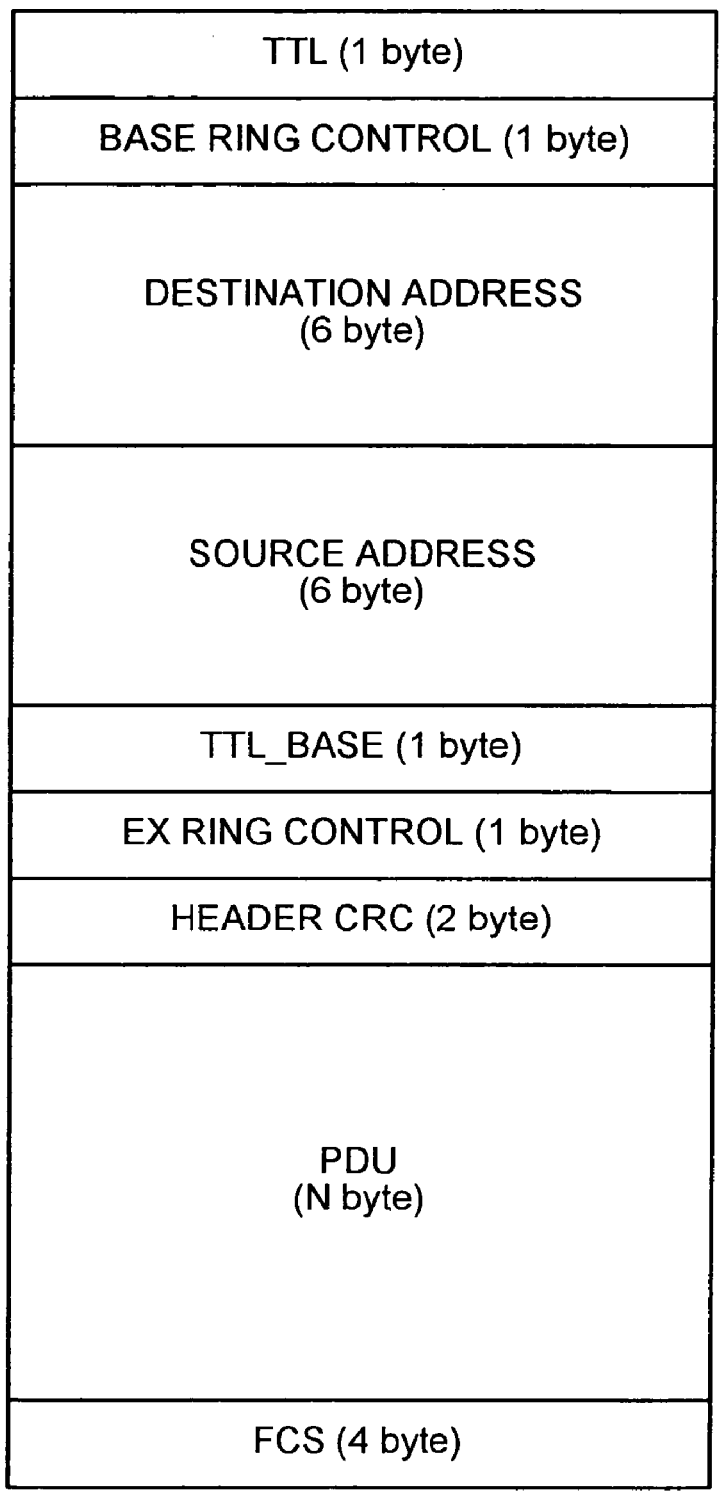
FIG. 6 is a schematic of a format of a RPR packet.

FIG. 6 is a schematic of a format of an RPR packet. This format is defined in IEEE802.17 RPR (draft). The keep-alive packet has the RPR packet format shown in FIG. 6.

Figure 7:
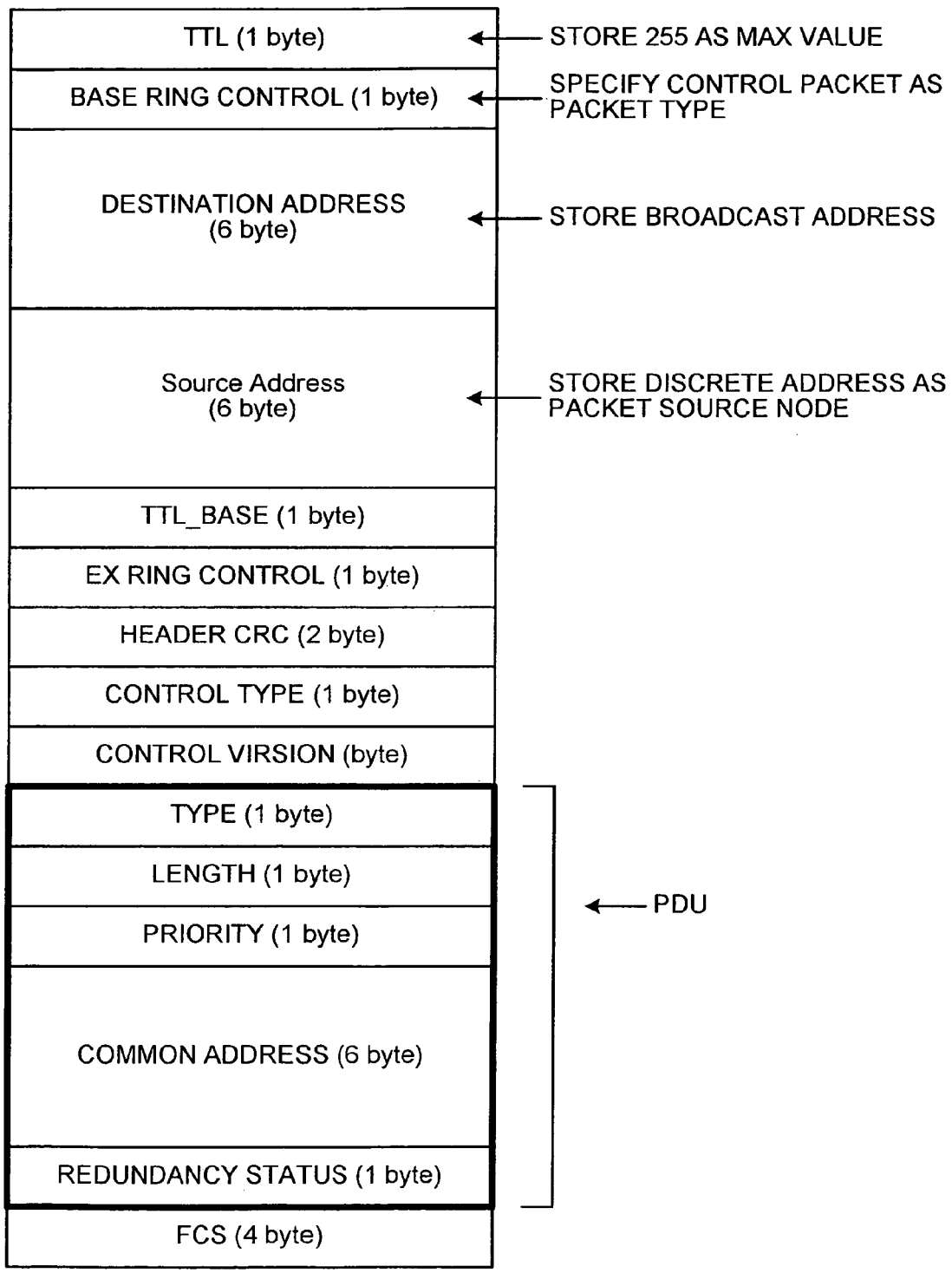
FIG. 7 is a state transition diagram of a redundant node device.

FIG. 7 is a view illustrating a format of the keep-alive packet. The keep-alive packet is a control packet for determining type of the RPR packet. When a destination address of an RPR packet transmitted from a node is that of the node itself, the control packet is terminated at the node.

By using the RPR control packet for the keep-alive packet, the processing for terminating the keep-alive packet can be easily performed. Moreover, leakage of the keep-alive packet to outside of the RPR network can be prevented.

A control packet is further divided into a topology discovery message, a protection message, and an OAM (Operation Administration and Maintenance) message. The keep-alive message uses an OAM message. The OAM message is used for a keep-alive message, because, in a control packet, the OAM message provides a message format freely available to each vendor.

A value of 255 is set as the MAX value for TTL (Time To Live). A control packet is set as the packet type. A broadcast address is set as the destination address. With this configuration, all redundant node devices and node devices on the RPR network receive the keep-alive packet.

A discrete address for the source node transmitting the keep-alive message packet is set as the source address. 0x03 indicating OAM is set as the control type. 0x00 is set as the control version. The keep-alive information is set with the TLV (Type-Length-Value) formation in a PDU which is a payload section.

The keep-alive packet includes (1) priority, (2) common address, and (3) redundant status each set as information relating to the redundant node device therein. The (1) priority and common address (2) are as described above. The redundant status (3) indicates a current state of the redundant node device, and the state is classified into three types of default state, working state, and state for spare use.

Type indicates a type of data set in the PDU. Length indicates a length of PDU data including Type. With the configuration as described above, for instance, even when the accommodated keep-alive information is changed, the functional enhancement is possible by defining a new Type value. Further even when a data length of keep-alive information changes in association with the functional enhancement, the change can be accommodated by specifying the data length anew in the Length field.

Type has a 1-byte length, Length has a 1-byte length, Priority has a 1-byte length, Common address has a 6-byte length to accommodate the MAC address which the RPR generally used, and the redundant status has a 1-byte length. The redundant status requires only 2 bits for indicating the three states described above, and the remaining 6 bits are reserved.

The byte length or bit length of each field are only exemplary. That is, the present invention is not limited to the values mentioned above.

A keep-alive packet is transmitted with a transmission interval set with the transmission timer value described above.

In the first embodiment, when a redundant node in the working state (redundant node device #C, redundant node #G: Refer to FIG. 3) detects trouble in a node, the redundant node can transmit a keep-alive packet ignoring the transmission interval defined with the transmission timer value for a rapid switching.

As a result, when the redundant node in the working state detects trouble, the redundant node can automatically and instantly transmit a keep-alive packet ignoring the transmission time value, so that switching of the redundant node can quickly be performed.

Further, the redundant node in the working state (redundant node device #C, redundant node. #G: Refer to FIG. 3) monitors time out for reception of a keep-alive packet with a transmission interval longer than that specified by the transmission time value. Recognition of time out is performed according to the received time-out value described above.

There is the possibility that a keep-alive packet may be lost from the RPR network due to the packet abortion caused by a bit error or for any other cause, therefore, it is necessary to set a value somewhat larger than the transmission timer value to respond to loss of 1 or 2 packets.

FIG. 8 is a state transition diagram of a redundant node device. In this redundant node device, the redundant node Enable/Disable parameter is set to Enable, and the redundant node device decides the default state, the working state, and the state for spare use of the node according to the state transition shown in FIG. 8 and operates according to the decided state.

FIG. 9 is a ring topology table used in the first embodiment. Similar ring topology table is set in each of the redundant node devices (the redundant node devices #C, #E, #G and #H) and each of the node devices (the node devices #A, #B, #D, #F, #I and #J) and corresponds to a ring topology table 126 (Refer to FIG. 4) and a ring topology table 226 (Refer to FIG. 5). This table indicates a topology of the RPR network starting from the node.

It is assumed here that the ring topology table is set, for instance, in the node device #A.

The ring topology table is prepared with a topology packet which each redundant node device and each node device distribute on the RPR network. In other words, each redundant node device and each node device periodically broadcast-transit a topology packet on the RPR network.

A topology packet has a format of an RPR packet (Refer to FIG. 6), and a discrete address of the node is set as the source address, a broadcast address is set as the destination address, and the MAX value (=225) is set in TTL. The topology packet is broadcasted on the RPR network and received by all redundant node devices and all node devices.

When a redundant node device or a node device receives a topology packet, if the source address included in that packet is not identical to a discrete address of the node and the TTL value is not equal to 0 when decremented by 1, the node again transmits the topology packet to the RPR network.

As the default value of TTL is 255, the redundant node device and node device having received the topology packet can calculate the number of hops (distance) between the redundant node device or node device indicating the source address for the topology packet and the node by checking the TTL value of the topology packet.

Each of the redundant node devices and each of the node devices receive all of topology packets transmitted from other redundant node devices and node devises on the RPR network, calculate the number of hops for each topology packet, and prepare a ring topology table.

In the node address shown in the figure, addresses of each of the redundant node devices and each of the node devices (#A to #F shown in the figure) present on the RPR network and the common address (#T) are set in the node address. The common address is common to the redundant node device #C and the redundant node device #E (Refer to FIG. 3). The node address is acquired from a source address of the topology packet described above. Further the common address (#T) is acquired from a source address for a keep-alive packet.

The redundant node Enable is set to differentiate a redundant node device from a node device. ON is set in the redundant node Enable in a redundant node device. OFF is set in the redundant node Enable in a node device.

As the number of hops in an inner loop path, the number of hops from a node (in this case, a node device #A: Refer to FIG. 3) up to a target node in the inner (clockwise) loop is set. As the number of hops in an outer loop path, the number of hops from a node (in this case, node device #A: Refer to FIG. 3) up to a target node in the outer (counterclockwise) loop path is set. The number of hops in the inner loop path and the number of shops in the outer loop path are computed from the TTL in the topology packet described above.

Selection of an inner loop path or an outer loop path is performed by setting ON or OFF indicating which of the inner loop communication path and outer loop communication path (the inner loop communication path #10Li and the outer loop communication path #10Lo: Refer to FIG. 3) a packet to the node is to be transmitted. ON indicates selection, and OFF indicates non-selection.

Each redundant node device and each node device periodically transmits and receives topology packets, grasps the current topological state of the RPR network, and therefore can transfer a packet according to the policy of the shortest path and the like.

Descriptions of operations in the first embodiment are provided below. In FIG. 3, (1) redundant node Enable, (2) common address for redundant nodes=#T, and (3) priority=5 are set as default values for the parameters in the redundant node device #C. Similarly, (1) redundant node Enable, (2) common address for redundant nodes=#T, and (3) priority=3 are set as default values for the parameters in the redundant node device #E.

In the node device #A, the node device #B, and the node device #D in the RPR network #10, (1) redundant node Disable is set as the default value. Because the redundant node Disable is set in the node device #A, node device #B, node device #D and node device #F in the RPR network #10, (2) the common address for redundant nodes and (3) priority are not set in these devices.

In the RPR network #10, the node device #A, node device #B, redundant node device #C, node device #D, redundant node device #E and node device #F broadcast-transmit the topology packet after power is turned ON, or after initialization such as resetting.

The node device #A, node device #B, redundant node device #C, node device #D, redundant node device #E and node device #F prepare a ring topology table based on the received topology packet (Refer to FIG. 9).

The redundant node device #C and redundant node device #E execute the following operations other than transmission of a topology packet.

Namely, the redundant node device #C and redundant node device #E start the operation for state transition of node redundancy according to the sequence shown in FIG. 8 after power is turned ON, or after initialization such as resetting.

In FIG. 8, the redundant node device #C and redundant node device #E at first shift to the default state respectively. While doing so, the redundant link #10A and redundant link #10B are kept in the blocking state. In this state, the redundant node device #C and redundant node device #E transmit keep-alive packets respectively.

Then the redundant node device #C and redundant node device #E receive keep-alive packets other than those transmitted from the devices, and check (1) priority, (2) common address, and (3) redundancy status in each of the received keep-alive packets.

When (3) the redundancy status in the received keep-alive packet indicates the working state, it is determined that a node in the working state is present in the ring, and the node having received the keep-alive packet is shifted to the reserved state.

When the redundancy status indicates the default state, the node compares priority of the node itself to (1) priority in the keep-alive packet, and if the priority of the node itself is higher than the (1) priority in the keep-alive packet, the node is shifted to the working state. When (3) the redundancy status indicates the reserved state, the node is shifted to the working state.

In this case, the priority (=5) of the redundant node device #C is higher than that (=3) of the redundant node device #E, the redundant node device #C is shifted to the working state, and the redundant link #10A is set in the forwarding state. On the other hand, the redundant node device #E is shifted to the reserved state, and the blocking state of the redundant link #10B is preserved.

Each of the node devices having received the keep-alive packet (node device #A, node device #B, node device #D, and redundancy node device #F) reflects presence of the redundant node device #C and redundant node device #E to the topology table (Refer to FIG. 9).

In addition to the discrete address, the common address #T of the redundant node devices is set in the topology table. As the number of hops in the inner loop and the number of hops in the outer loop each corresponding to the common address #T, 6 is set indicating the total number of hops in the RPR network #10.

As the redundant node device #C is in the working state, the redundant node device #C transmits the packet received from the RPR network #20 via the redundant link #10A to the RPR network #10 according to the necessity (forwarding state). The redundant node device #E is in the reserved state, and therefore does not transact any packet via the redundant link #10B (blocking state).

When an RPR packet is transmitted from the client #X shown in FIG. 3, the redundant node device #C receives the RPR packet from the redundant link #10A, and transmits the RPR packet to the RPR network #10.

In this step, the redundant node #C sets, not a source address for the node but the common address #T for redundant nodes as the source address at a header of the RPR packet.

The node device #A having received the RPR packet from the redundant node device #C stores, as a routine operation, a source MAC address for the client #X set in the RPR packet and a source address (common address #T) in the header of the RPR packet in an MAC table (not shown) in the node without especially being aware of the fact that the redundant node device #C is a redundant node device and at the same time for current use.

Then the node device #A having received a client packet with the MAC address for the client #X as the destination MAC address searches for the MAC table in the node according to the MAC address of the client #X as a key. In this case, as the MAC address of the client #X and the common address #T have been set in the MAC table, the common address #T is searched.

Then the node device #A searches the ring topology table (Refer to FIG. 9) referring to the common address #T as a key in this case, the number of hops in the inner loop path=6, the number of hops in the outer loop path=6, selection of the inner loop path=ON, and selection of the outer loop path=OFF are searched.

With the operation described above, the node device #A sets as a destination address for the RPR packet header, #A as a source address, and 6 as the TTL value, and transmits the RPR packet to the inner loop communication path #10Li. A node device having received the RPR packet (a redundant node device) compares the address of the node itself to the destination address (#T) of the RPR packet header, and when it is determined that the two addresses are identical, the node device receives the RPR packet.

When the two addresses are not identical, the node device does not receive an RPR packet, and passes the RPR packet to the inner loop communication path #10Li.

In this case, the destination address (#T) is identical to the redundant node device #C and redundant node device #E in each of which #T is set as the common address.

Because the redundant node device #C and redundant node device #E have the packet destination address identical to the common address set in each of the nodes, and therefore receive the RPR packet and then transmit the RPR packet to the inner loop communication path #10Li.

The redundant node device #C and redundant node device #E also decrement the TTL value of the RPR packet by 1.

The RPR packet received by the redundant node device #C and redundant node device #E goes around the inner loop communication path #10Li, and is finally received by the node device #A. In the node device #A, the TTL value is zero (0) after decremented by 1, and the source address is the same as the address of the node, the RPR packet is deleted from the RPR network #10.

The redundant node device #C and redundant node device #E having received the RPR packet to the destination address (#T) operate as described below.

The redundant node device #C is for current use, and therefore the redundant node device #C properly processes the received RPR packet, and transmits the received RPR packet to the redundant link #10A (forwarding state). On the other hand, the redundant node device #E is for spare use, and therefore receives and then aborts the RPR packet (blocking state).

Figure 10:
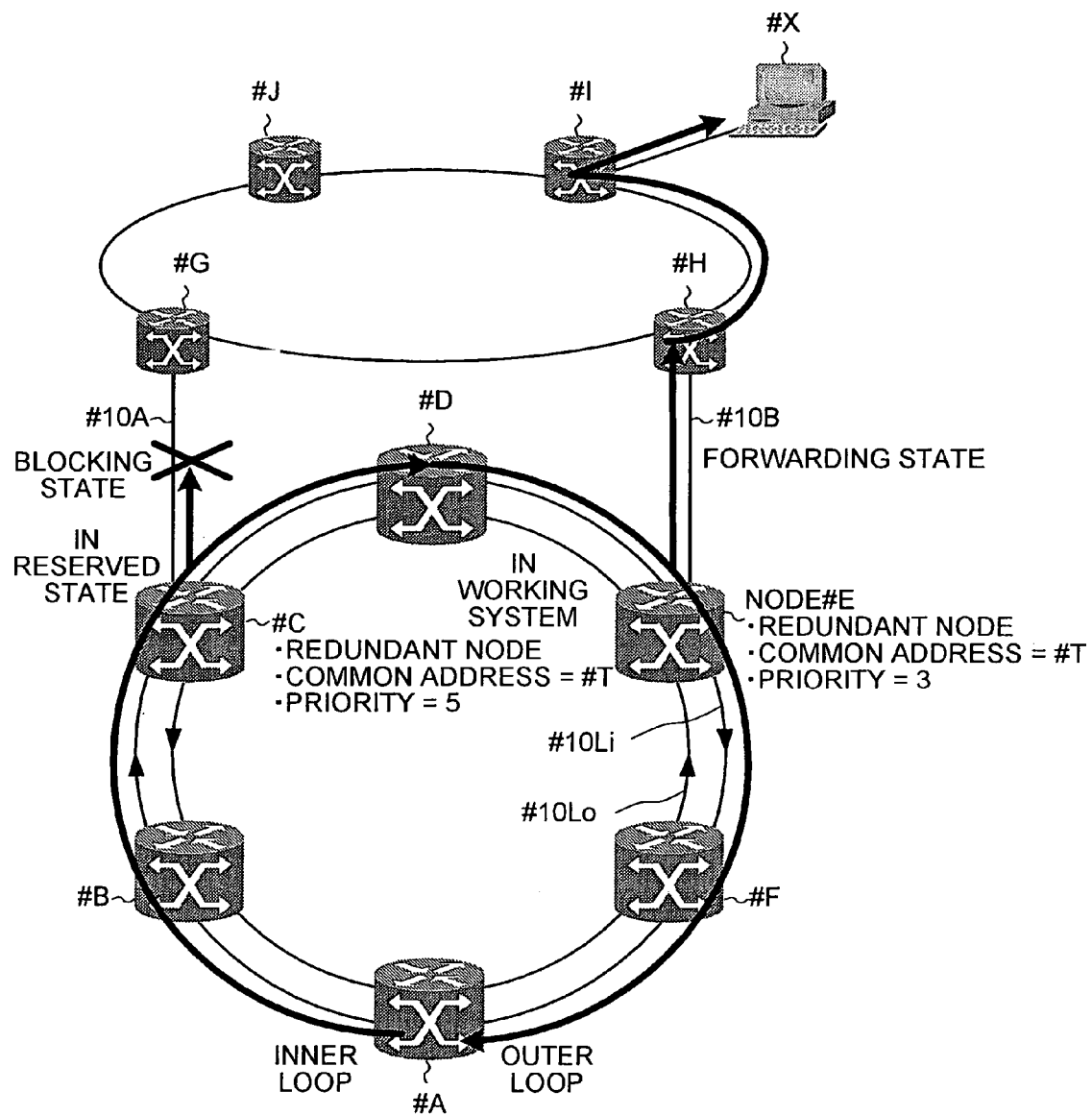
FIG. 10 is a schematic for explaining switching of node redundancy.

Next, operations when redundant node switching occurs between the redundant node device #C and redundant node device #E are described below. When trouble occurs in the redundant link #10A or in the redundant node device #C, as shown in FIG. 8 and FIG. 10, the redundant node device #C shifts the redundant state from the working state to the reserved state.

The redundant node device #C shifts the redundant status of the keep-alive packet to the reserved state, transmits the keep-alive packet, and set the node device #A in the blocking state.

Then the redundant node device #E having received the keep-alive packet from the redundant node device #C shifts the redundancy status of the node itself from the reserved state to the working state because the redundancy status of the redundant node device #C is in the reserved state.

In the first embodiment, the node device #A, node device #B, node device #D, and node device #F other than the redundant node devices (redundant node device #C and redundant node device #E) are not required to be aware of redundancy node switching.

When an RPR packet to the client #X is transmitted after redundant node switching, the node device #A may transmit an RPR packet having the common address (=#T) learned and stored in the MAC table (not shown) as a destination address and TTL value of 6. This RPR packet is received by the redundant node device #C and redundant node device #E like before the note switching.

The redundant node device #C having received the RPR packet aborts this RPR packet because the node is for spare use. On the other hand, the redundant node device #E receives the RPR packet because the node is for current use, and transmits the RPR packet to the redundant link #10B. With this operation, the RPR packet is received via the redundant link #10B and the RPR network #20 by the client #X.

As described above, in the first embodiment, the number of optical fibers required in a network as a whole can be reduced. As a result, node switching can be performed quickly.

Furthermore, a common address (=#T) is allocated to the redundant node device #C as well as to the redundant node device #E, and the common address and a source address of an RPR packet from the client #X is (learned and) set in the MAC table in each node device, and therefore each node device is not required to update the ring topology table and the MAC table, which allows for high speed and accurate redundant node switching.

Moreover, a discrete address and a common address are allocated to each of the redundant node device #C and redundant node device #E, so that each node can make both point-to-point communications and point-to-multipoint communications with each of the redundant node devices.

Furthermore, both the redundant node device #C and redundant node device #E broadcast-deliver the discrete addresses to each node device using a topology packet, and therefore the discrete addresses of the redundant node device #C and redundant node device #E can be set in the ring topology table as described in relation to FIG. 9.

Each node device can make point-to-point communications even with the redundant node device #C (redundant node device #E).

For instance, when it is necessary to transmit point-to-point a packet for checking normal operations of each node (for testing) such as a Ping packet or an OAM packet from the node device #A to the redundant node device #C and to the redundant node device #E, it is required only to set discrete addresses of the redundant node device #C and redundant node device #E as destination addresses of the RPR packets. With this functional configuration, it is possible to read out an optimal inner loop/outer loop communication paths and the TTL values for transmitting the packet.

In the first embodiment (Refer to FIG. 3), an RPR packet to a common address (to the redundant node device #C and redundant node device #E) is transmitted to either one of the inner loop communication path #10Li or outer loop communication path #10Lo, and the packet goes around through the selected communication path and is deleted in the node device having transmitted the packet.

For instance, when the node device #A transmits an RPR packet to the common address #T through the inner loop communication path #10Li, the RPR packet is transmitted unnecessarily from the redundant node device #E to node device #F and from the node device #F to the node device #A.

To overcome this problem, in a first variant of the first embodiment, the unnecessary packet transmission in the zone is not performed for improving the utilization factor of the ring band (communication band of the inner loop communication path #10Li or outer loop communication path #10Lo). The techniques and methods for improving the utilization factor are described below.

In the first variant, the ring topology table illustrated in FIG. 11 is used in place of the ring topology table illustrated in FIG. 9. The ring topology tale shown in FIG. 11 is an example of a table set in the node device #A, and the number of hops to the utmost far end redundant node device (having a common address) from a node is set as the number of hops in the inner loop and a number of hops in the outer loop.

Figure 12:
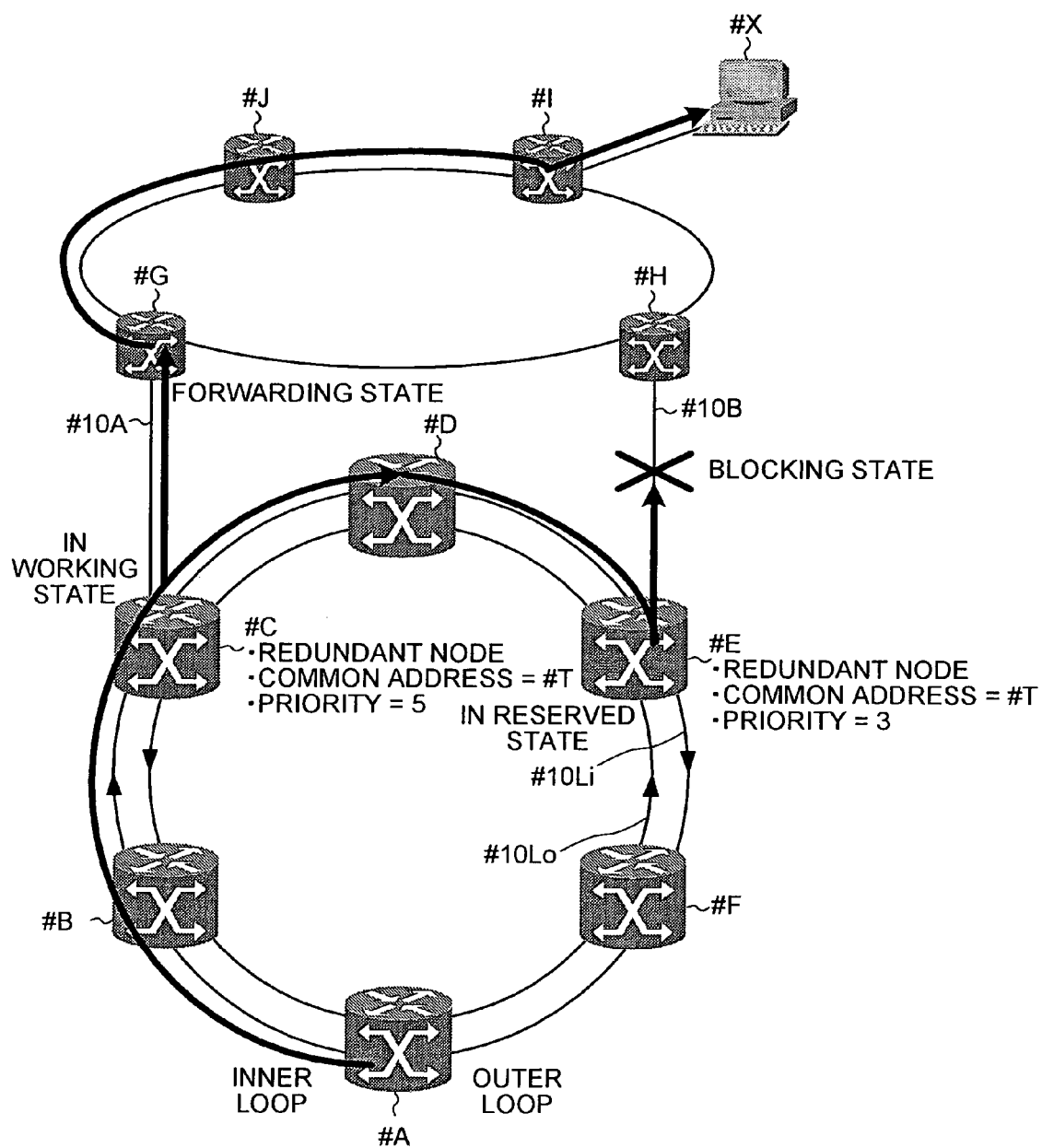
FIG. 12 is a schematic of operations in the first variant of the first embodiment.

The number of hops from the node (node device #A) shown in FIG. 12 to the utmost far end redundant node device #E in the inner loop communication path #10Li is 4, and this value is set as the number of hops in the inner loop.

On the other hand, the number of hops from the node (node device #A) to the utmost far end redundant node device #C in the outer loop communication path #10Lo is 4, and this value is set as the number of hops in the outer loop.

In the first variant, an RPR packet to a redundant node device is transmitted through the inner loop communication path #10Li, so that the inner loop path in the ring topology table is set ON and the outer loop path is set OFF.

With the functional configuration as described above, an RPR packet to a redundant node device transmitted from the node device #A shown in FIG. 12 through the inner loop communication path #10Li is subjected to the processing for decrementing the TTL value by 1 in the redundant node device #E, so that the TTL value is zero (TTL=0) and the RPR packet is deleted in the redundant node device #E.

As described above, in the first variant of the first embodiment, the RPR packet transmitted from the node device #A to the redundant device is not required to pass through the zone from the redundant node device #E to the node device #F and then to the node device #A, so that the utilization factor of a ring band can be improved.

The numbers of hops from the node device #A to the utmost far end redundant node both through the inner loop communication path #10Li and through the outer loop communication path #10Lo are 4. In contrast, when viewed from the node device #B, the number of hops to the utmost far end redundant node device through the inner loop communication path #10Li is 3, and that through the outer loop communication path #10Lo is 5. Therefore the shortest path is provided by selecting the inner loop communication path #10Li having a smaller number of hops.

In the first embodiment (Refer to FIG. 3) and its first variant (Refer to FIG. 12), an RPR packet to a common address (to the redundant node device #C or redundant node device #E) is transmitted to either one of the inner loop communication path #10Li and outer loop communication path #10Lo each set in the fixed state.

In contrast, in a second variant of the first embodiment, an RPR packet to a redundant node device is transmitted to both the inner loop communication path #10Li and outer loop communication path #10Lo, so that the utilization factor of a ring band can be further improved.

In the second variant, the ring topology table shown in FIG. 13 is used in place of the ring topology table shown in FIG. 9. The ring topology table shown in FIG. 13 is an example of a table set in the node device #A, and the number of hops in the inner loop, the number of hops in the outer loop, and the number of hops from the node device #A to the nearest redundant node device (having a common address) are set in the table.

Figure 14:
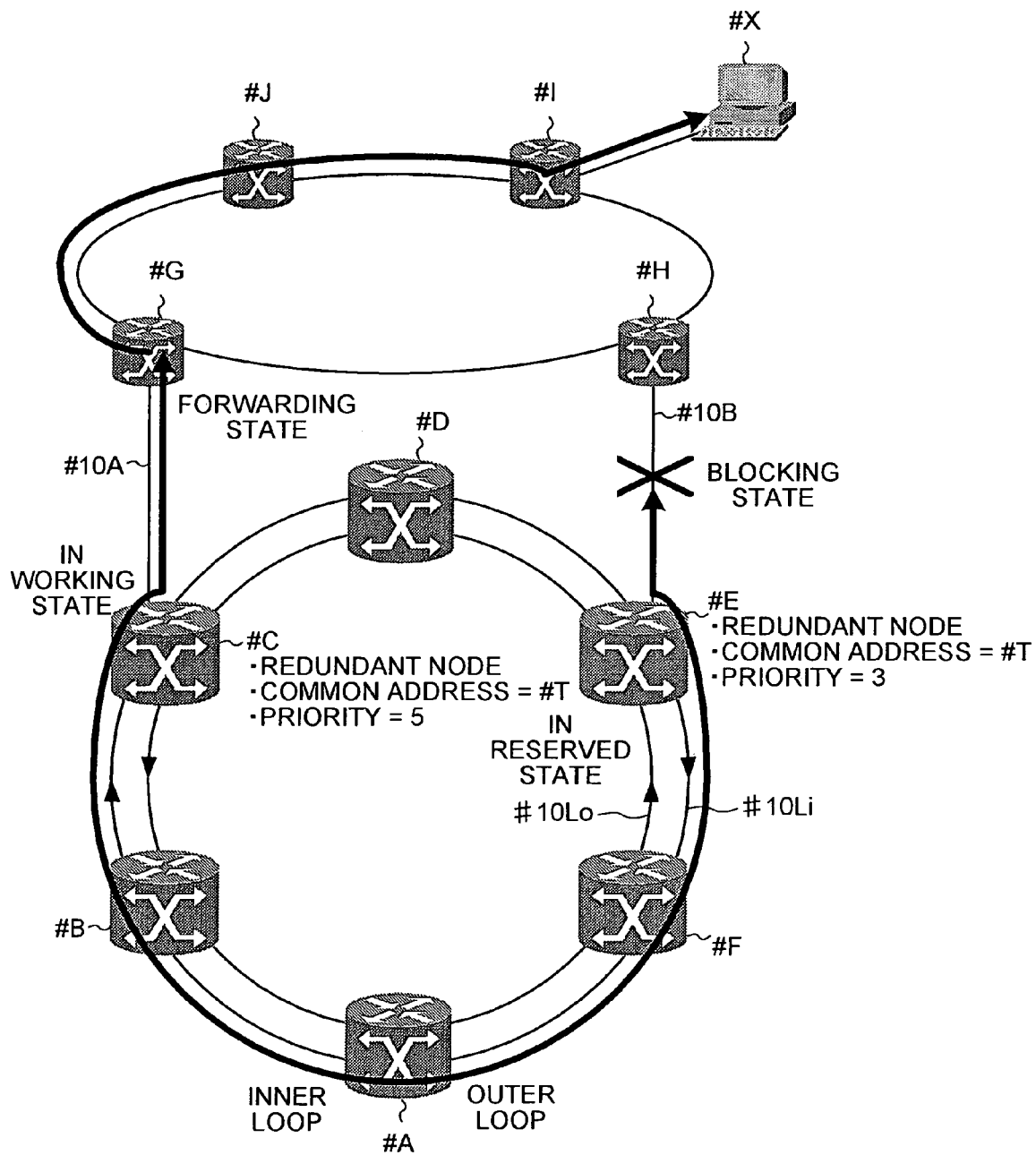
FIG. 14 is a schematic of operations in a second variant of the first embodiment.

As the number of hops in the inner loop, 2 indicating the number of hops from the node shown in FIG. 14 (node device #A) to the nearest redundant node device #C through the inner loop communication path #10Li is set.

As the number of hops in the outer loop, 2 indicating the number of hops from the node (node device #A) to the nearest redundant node device #C through the outer loop communication path #10Lo is set.

In the second variant, an RPR packet to a redundant node device is transmitted through the inner loop communication path #10Li or outer loop communication path #10Lo, and selection of the inner loop path is set ON and also selection of the outer loop path is set ON in the ring topology table.

With this functional configuration, when searching for a destination address (=#T) in a topology table, when selection of the inner loop path is set ON and also selection of the outer loop path is set ON in the ring topology table, the RPR packets are copied, the numbers of hops read out from the topology table are stored in the respective RPR packets, and the RPR packets are transmitted to both the inner loop communication path #10Li and outer loop communication path #10Lo.

The transmitted RPR packets have the TTL value of 2, the TTL value is decremented to zero in the redundant node device #C and in the redundant node device #E respectively, so that the RPR packets are deleted therein.

With the functional configuration as described above, the RPR packets transmitted from the node device #A to the inner loop communication path #10Li and outer loop communication path #10Lo respectively are not required to pass through the zone from the redundant node device #C to node device #D and then to the redundant node device #E, so that the utilization factor of the ring band is further improved.

In a third variant of the first embodiment, each node can select the optimal method for setting the topology table shown in FIG. 9, FIG. 11, and FIG. 13 in consideration to a network design or the ring network state collected with the topology packet.

Transmission of an RPR packet to the redundant node device #C or to the redundant node device #E is influenced by such factors as the number of nodes in the RPR network #10, a position of each redundant node device, and even a distance from a node device to each redundant node device (the number of hops).

Therefore, which of the first and second variants should be used for a higher utilization factor of the ring band varies according to each node device.

For instance, when the node device #B shown in FIG. 3 transmits an RPR packet to a redundant node device with the method in the first variant, a higher utilization factor of the ring band is provided by the inner loop communication path #10Li is used and the TTL value is set to 3.

When the node device #D transmits an RPR packet to a redundant node device, a higher utilization factor of a ring band is provided by transmitting an RPR packet with the TTL value of 1 through the inner loop communication path #10Li and an RPR packet with the TTL value of 1 through the outer loop communication path #10Lo respectively by means of the method in the second variant.

In the third variant, each node device on the RPR network #10 can build an optimal ring topology in consideration of the features as described above, and further the topology table in the first variant and that in the second variant may coexist.

In the first embodiment described above, the configuration was described in which the RPR network #1 and RPR network #2 are connected to each other with redundancy, but also the configuration is allowable in which the RPR network and a tree type of network are connected to each other with redundancy. This configuration is described below as a fourth variant of the first embodiment.

Figure 15:
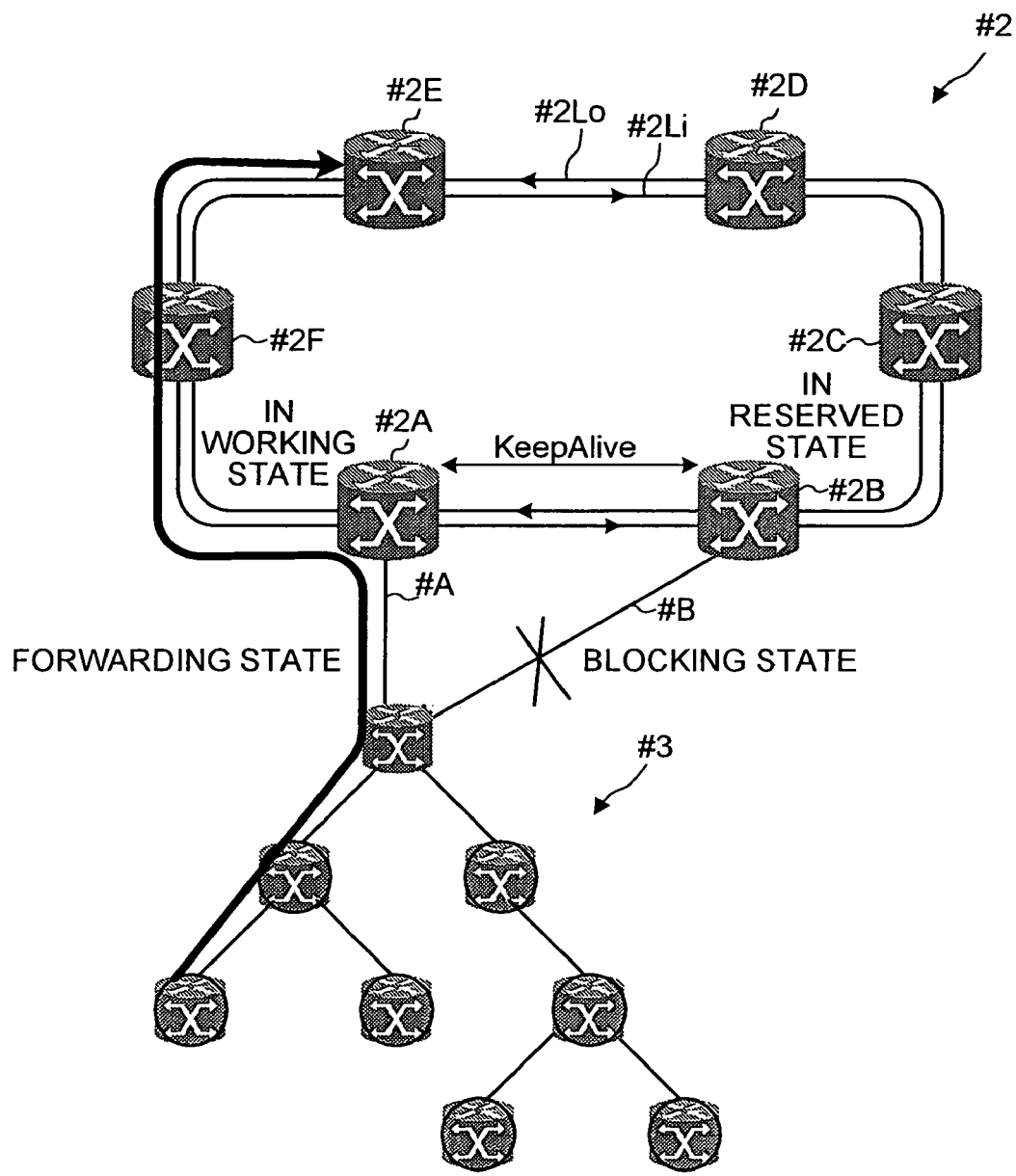
FIG. 15 is a schematic of a network according to a fourth variant of the first embodiment.

FIG. 15 is a schematic for explaining the fourth variant of the first embodiment. In FIG. 15, the same reference numerals are assigned to the components corresponding to those shown in FIG. 1. A tree type of network #3 is connected, in place of the RPR network #1 shown in FIG. 1, to the RPR network #2.

FIG. 15 is a block diagram illustrating network configuration in which RPR node redundancy is applied, when the RPR network #2 is a occurrence relation network and the tree type of network #3 is an access network for connecting user data, for improving the reliability of the occurrence relation network for processing wealth of data.

In this case, the tree type of network #3 is not required to have any redundant node device, but is required to have a link redundancy function for redundancy with the node device #2A and redundancy node device #2B.

When the redundant link is a SONET/SDH line, high speed switching of redundant nodes can be carried out by applying the technique such as ASP(1+1) and the like to the redundant link #A and redundant link #B.

Figure 16:
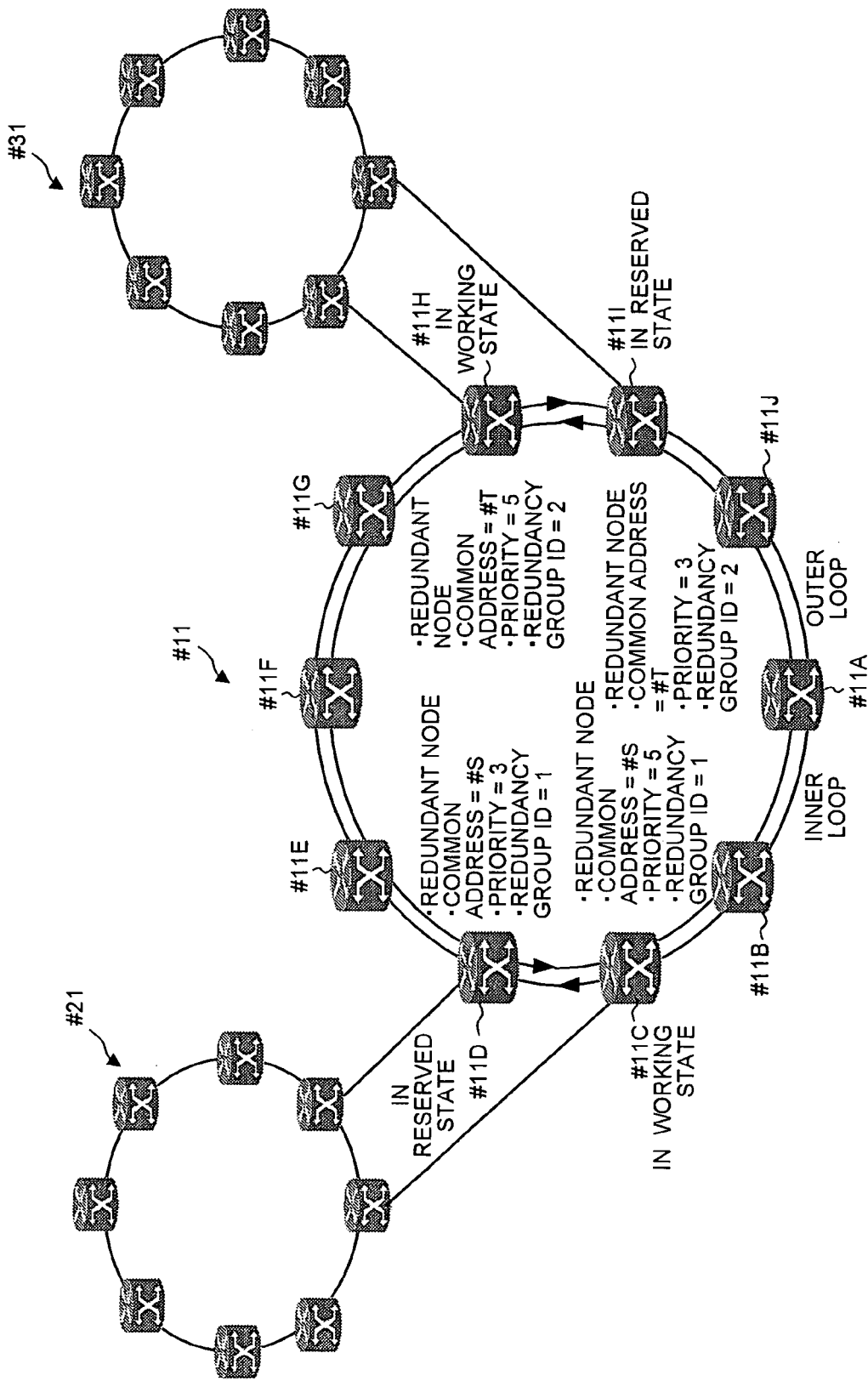
FIG. 16 is a schematic of a network according to a second embodiment of the present invention.

FIG. 16 is a schematic of a network according to a second embodiment of the present invention. In the second embodiment, a plurality of redundant groups can be provided on an RPR network.

In an RPR network #11 shown in FIG. 16, a redundant node device #11C and a redundant node device #11D are provided as a redundancy group, and a redundant node device #11H and a redundant node device #11I are provided as another redundancy group.

The RPR network #11 is connected to an RPR network #21 as well as to an RPR network #31 in the redundant state.

For the redundant node device #11C and redundant node device #11D, the redundancy group ID is set to 1, and the common address is set to #S. The redundancy group ID is an identifier for identifying a redundancy group.

On the other hand, for a redundancy node device #11H and a redundancy node device #11I, the redundancy group ID is set to 2, and the common address is set to #T. As described above, different common addresses are set to different redundancy groups respectively.

In the second embodiment, in addition to (1) priority, (2) common address, and (3) redundant state, (4) redundant group ID is added to a PDU of the keep-alive packet shown in FIG. 7. The redundancy group ID (4) is set to the default state, like other parameters, after power is turned ON, or after resetting.

As described above, in the second embodiment, by adding a redundancy group ID, a group of redundant node devices in an RPR network is more clarified.

Although it is possible to differentiate redundancy groups without adding a redundancy group ID to a keep-alive packet because redundancy groups have different common addresses respectively, and in the second embodiment, also a redundancy group ID is added to a keep-alive packet fur the purpose to prepare a ring topology table with higher reliability.

Further, in the second embodiment, the ring topology table shown in FIG. 17 is used in place of the ring topology table shown in FIG. 9. In the ring topology table shown in FIG. 17, a redundancy group ID is added, and in addition #S and #T are set as common addresses.

As described above, with the second embodiment, by defining a plurality of redundancy groups in one RPR network #11, a plurality of redundant node device groups can be arranged.

Figure 18:
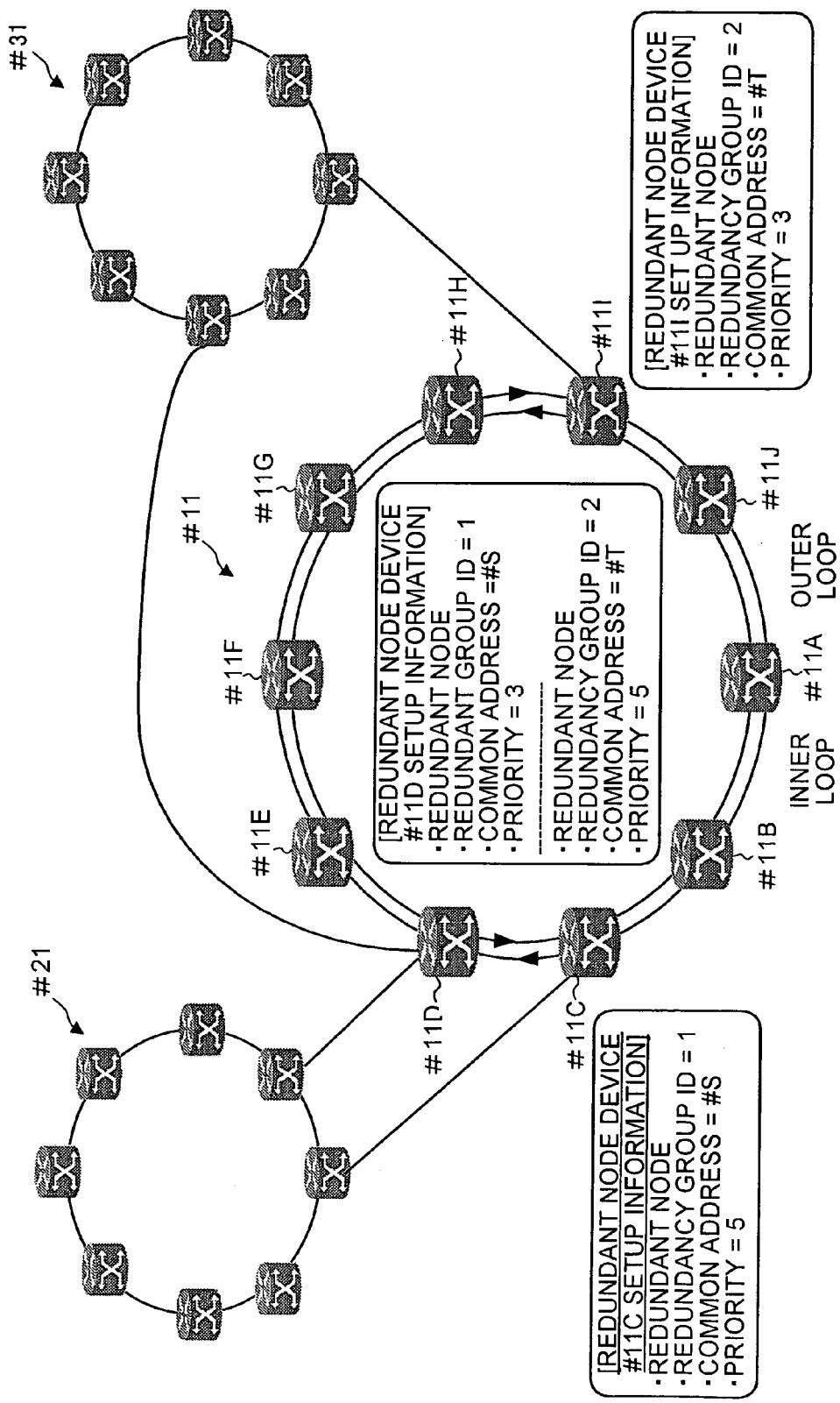
FIG. 18 a schematic of a network according to a third embodiment of the present invention.

FIG. 18 is a schematic of a network according to a third embodiment of the present invention. The third embodiment enables one redundant node device on an RPR network to belong to a plurality of redundant groups. In FIG. 18, the same reference numerals are assigned to the components corresponding to those shown in FIG. 16.

In the RPR network #11, a redundant node device #11C and a redundant node device #11D are provided as a redundancy group, and a redundant node device #11C and a redundant node device #11I are provided as another redundancy group.

For the redundancy node device #11C and the redundancy node device #11D, the redundancy group ID is set to 1, and the common address is set to #S.

For the redundancy node device #11D and the redundancy node device #11I, the redundancy group ID is set to 2, and the common address is set to #T.

The redundant node device #11D herein belongs to both the redundancy group whose ID is set to 1 and another redundancy group whose ID is set to 2. In this case, the following information concerning the redundancy group whose ID is set to 1 and another redundancy group whose ID is set to 2 is discretely set in the redundant node device #11D.

As the information concerning the redundancy group whose ID is set to 1, (1) redundant group ID of 1, (2) common address of #S and (3) priority of 3 are set.

As the information concerning the redundancy group whose ID is 2, (1) redundant group ID of 2, (2) common address of #T and (3) priority of 5 are set.

The redundant node device #11D can be operated in the redundancy group whose ID is set to 1 and the redundancy group whose ID is set to 2 for current use and for spare use respectively.

In the third embodiment, information on a plurality of redundancy groups is set in a PDU in a keep-alive packet shown in FIG. 7.

In the case of the redundant node device #11D, information on both the redundancy group with the ID set to 1 and the redundancy group with the ID set to 2 is set in a keep-alive packet, and the keep-alive packet is broadcast-delivered to the RPR network #11.

With this operation, each redundant node device and each node device having received the keep-alive packet prepare a ring topology table shown in FIG. 19.

In a fourth embodiment according to the present invention, also in a redundant node device for spare use, occurrence of flooding due to unlearning of a packet in an MAC table in a new node in the working state is prevented by making the MAC table learn a source node address of an RPR packet and a source address of a client packet (an RPR packet transmitted from a client).

Figure 20:
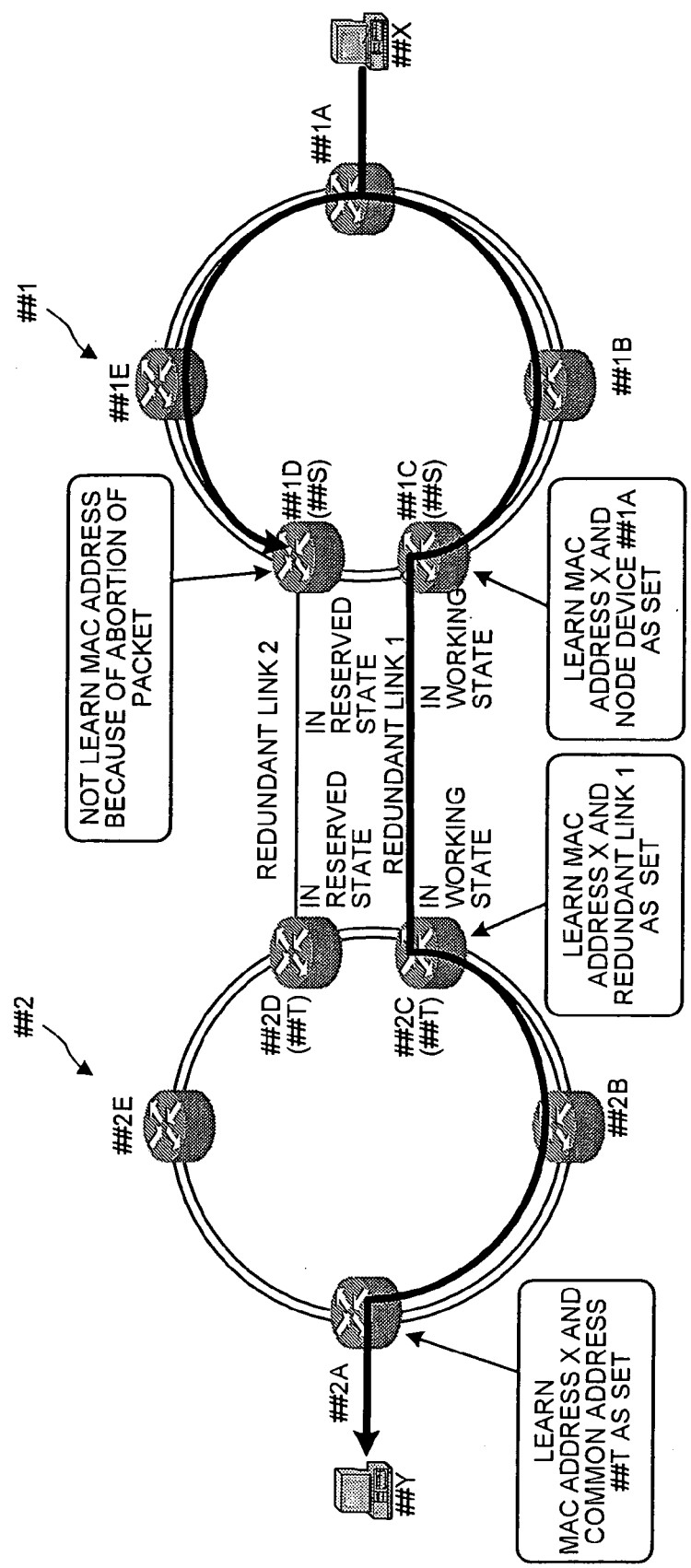
FIG. 20 is a schematic of a transmission operation from a client ##X to a client ##Y in a forth embodiment of the present invention.

The fourth embodiment is described below with reference to FIG. 20 to FIG. 22. FIG. 20 is a schematic of a packet transmitting operation from a client ##X to a client ##Y in the fourth embodiment.

In FIG. 20, an RPR network ##1 and an RPR network ##2 are connected to each other with a redundant link 1 and a redundant link 2.

The RPR network ##1 includes a node device ##1A, a node device ##1B, a redundant node device ##1C, a redundant node device ##1D, a node device ##1E, an inner loop communication path and an outer loop communication path. The redundant node device ##1C (for current use) and the redundant node device ##1D (for spare use) are provided with ##S as a common address thereto. The client ##X is connected to the node device ##1A.

In the meantime, the RPR network ##2 includes a node device ##2A, a node device ##2B, a redundant node device ##2C, a redundant node device ##2D, a node device ##2E, an inner loop communication path and an outer loop communication path. The redundant node device ##2C (for current use) and the redundant node device ##2D (for spare use) are provided with ##T as a common address thereto. The client ##Y is connected to the node device ##2A.

In this figure, when an RPR packet is transmitted from the client ##X with the MAC address X provided therein to the client ##Y with the MAC address Y provided therein, the node device ##1C receives the RPR packet, makes the MAC table learn the MAC address X and the node device ##1A as a set, and then transmits the RPR packet to the redundant link 1.

The redundant node device ##2C makes the MAC table learn the MAC address X and the redundant link 1 as a set, and then transmits the RPR packet to the RPR network ##2.

The node device ##2A makes the MAC table learn the MAC address X and the common address ##T as a set, and then transmits the RPR packet to the client ##Y. As described above, each redundant node device and each node device learn the MAC address X in the packet transmission from the client ##X to the client ##Y.

Figure 21:
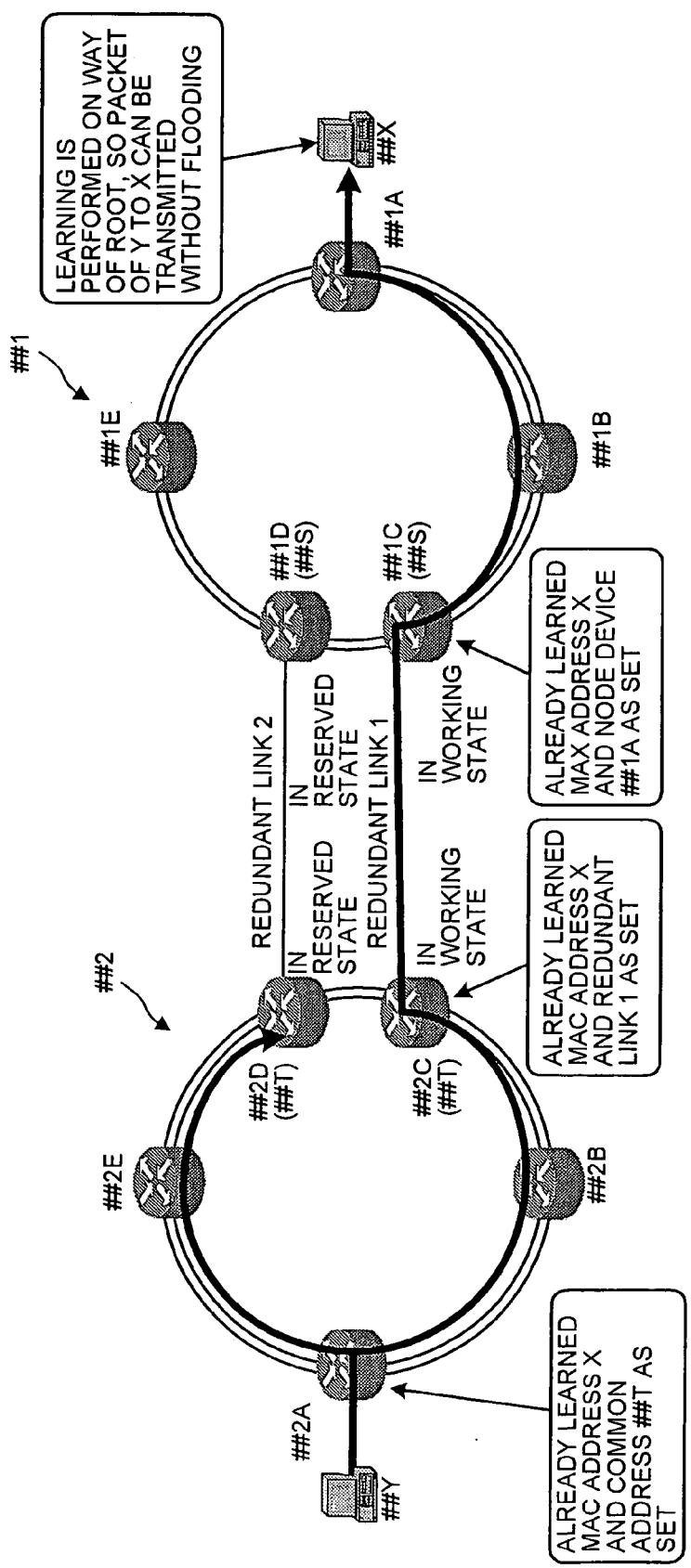
FIG. 21 is a schematic of transmission operation from a client ##Y to a client ##X in the forth embodiment.

FIG. 21 is a schematic of operations of packet transmission from the client ##Y to the client ##X in the fourth embodiment. In FIG. 21, when an RPR packet is transmitted from the client ##Y with the MAC address Y provided therein to the client ##X with the MAC address X provided therein, because each redundant node device and each node device have already learned the MAC address X of the client ##X, each redundant node device and each node device operate as follows.

The node device ##2A receiving the RPR packet from the client ##Y has already learned the destination MAC address X and the common address ##T, so that the node device ##2A transmits the RPR packet to the RPR network ##2 taking a destination address of the RPR header as the common address ##T.

The redundant node device ##2C receiving the RPR packet has already learned the MAC address X and a redundant link 1, so that the redundant node device ##2C transmits the RPR packet to the redundant link 1. The redundant node device ##1C receiving the RPR packet has already learned the MAC address X and a destination address ##1A, so that the redundant node device ##1C transmits the RPR packet to the RPR network ##1 taking a destination address of the RPR header as ##1A. The node device ##1A having received the RPR packet transmits the packet to the client ##X.

As described above, in the packet transmission from the client ##Y to the client ##X, each node device and each redundant node device have already learned the MAC address X, so that an effective packet transfer can be performed without occurrence of flooding due to unlearning of a packet on the track of a route.

Figure 22:
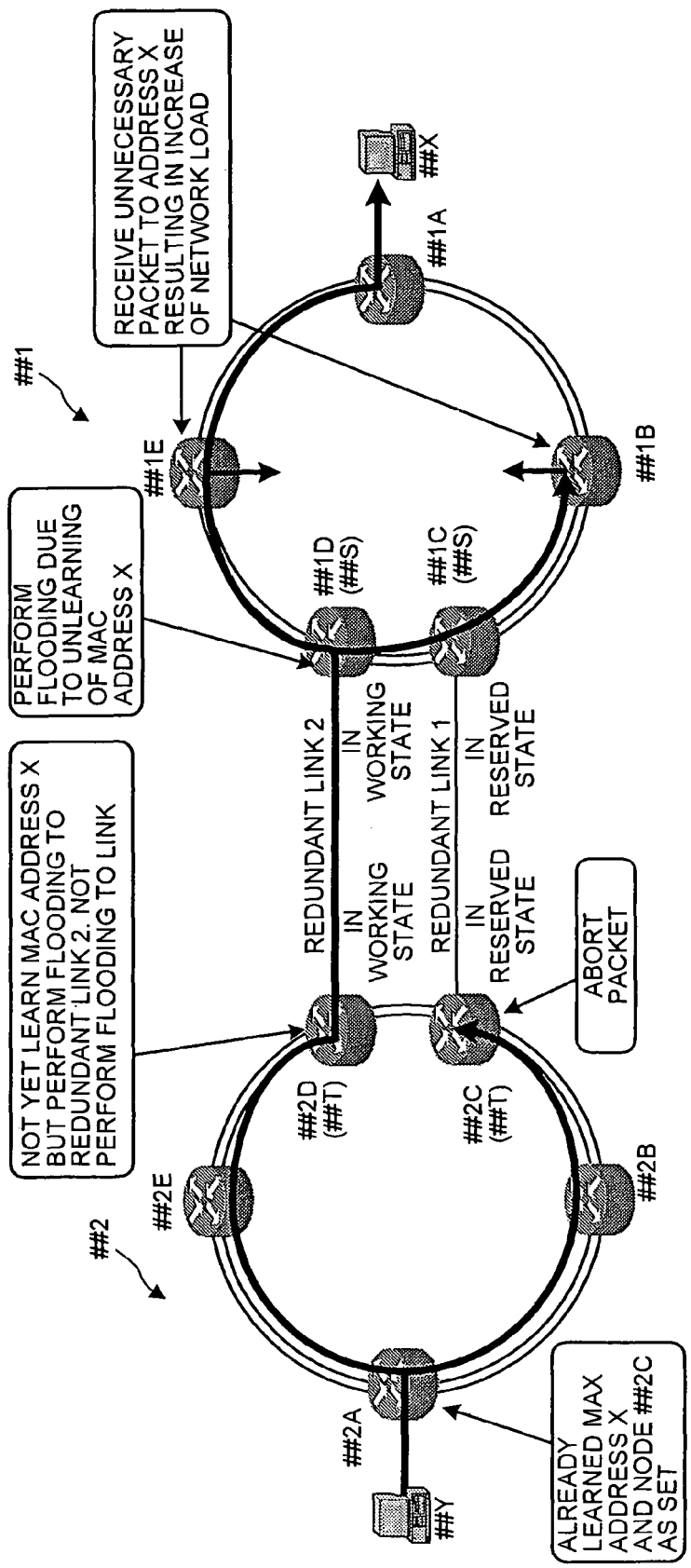
FIG. 22 is a schematic of operations after switching redundant nodes in the forth embodiment.

FIG. 22 is a schematic of operations after switching a redundant node in the fourth embodiment. Descriptions are provided below assuming a case where an RPR packet is transmitted after switching a redundant node.

In FIG. 22, an operation of transmitting a packet from the client ##Y to the client ##X is illustrated when a redundant node is switched after the packet transmission described in FIG. 20.

The node device ##2A receiving the RPR packet from the client ##Y has already learned the destination MAC address X and the common address ##T, so that the node device ##2A transmits the RPR packet to the RPR network ##2 taking a destination address of the RPR header as ##T.

In this case, however, the redundant node device ##2D is for current use while the redundant node device ##2C is for spare use, so that the redundant node device ##2C aborts the received RPR packet.

On the other hand, the redundant node device ##2D searches for a MAC table employing the MAC address X which is a destination address of the received RPR packet.

In this case, however, the MAC address X has not yet been learned in the MAC table, which may cause flooding. Nevertheless, RPR packet transmission to a ring (RPR network ##2 to which a node itself belongs) is not performed in the case of flooding in order that a node device does not doubly receive the RPR packet.

When the redundant node device ##2D has a line port other than a redundant link, the RPR packet is flooded to the port.

As the redundant node device ##2D only has a redundant link 2, the RPR packet is transmitted to the redundant link 2. The redundant node device ##1D having received the RPR packet searches for a MAC table employing the MAC address which is a destination address of the RPR packet.

However, the MAC table has not yet learned the MAC address X, which may cause flooding. The redundant node device ##1D transmits the RPR packet to the RPR network ##1 taking a destination address of the RPR packet as a broadcast address.

In this case, each node device and each redundant node device in the RPR network ##1 receive the RPR packet and perform flooding to all ports of the node of its own, because the destination address of the RPR packet is a broadcast address.

As described above, the redundant node device ##1D newly employed for current use has not yet learned the MAC address X, the RPR packet is disadvantageously flooded to the node devices on the other ring, so that each node device on the ring temporarily has an increased loading.

In this embodiment, only one example in which an RPR packet is transferred between the client ##X and the client ##Y is shown, however, the RPR packet between a number of terminals connected under controls of the node devices ##1B, ##1E, ##2B and ##2E may be subjected to flooding after switching a redundant node.

The more the number of nodes on a ring and that of terminals connected under controls of the nodes are, the higher the loading on a network becomes due to flooding after switching a redundant node.

Figure 23:
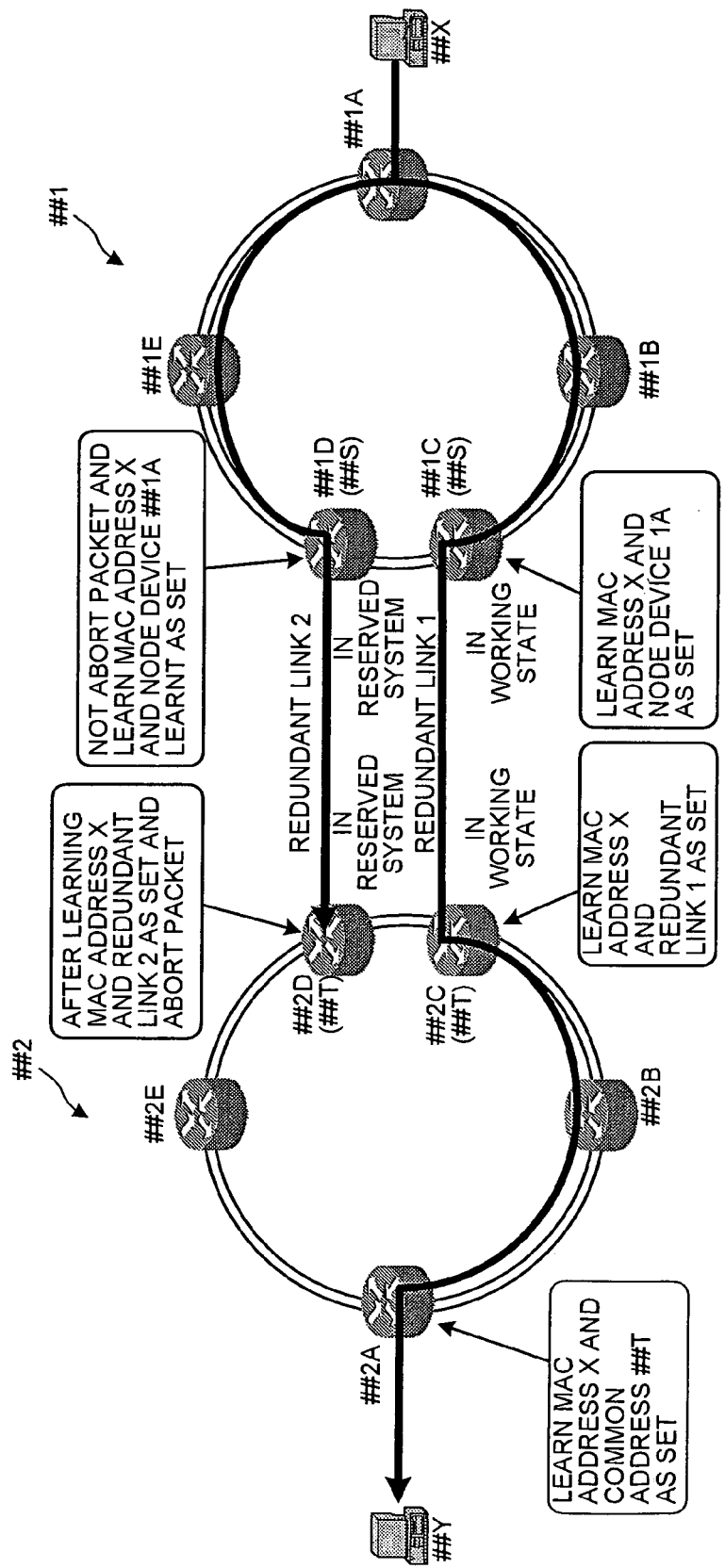
FIG. 23 is a schematic of operations in a fifth embodiment of the present invention.

In a fifth embodiment of the present invention, the redundant node device ##1D for spare use shown in FIG. 23 does not abort an RPR packet received from the RPR network ##1, but makes the MAC table learn that the MAC address and the node device ##1A as a set and then transmits the RPR packet to a redundant link 2.

The redundant node device ##2D having received the RPR packet from the redundant link 2 learns that the MAC address X and the redundant link 2 are taken as source ports in the MAC table, and aborts the RPR packet after the learning.

Figure 24:
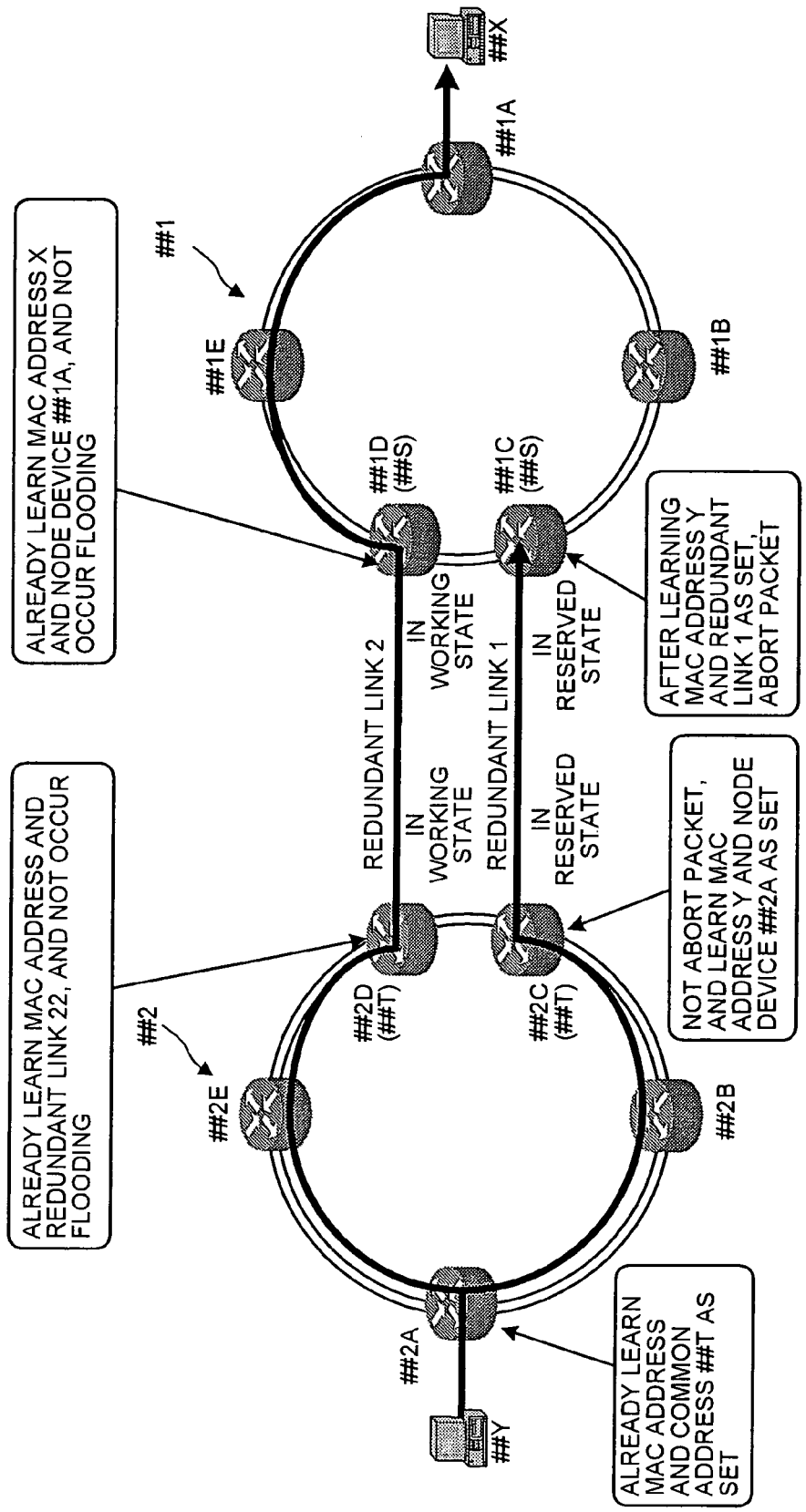
FIG. 24 is a schematic of operations in the fifth embodiment.

FIG. 24 is a schematic of operations in the fifth embodiment.

In FIG. 24, the node device ##2A having received an RPR packet from the client ##Y transmits the RPR packet to a ring taking a destination address of the RPR header as the common address ##T, because the node device ##2A has already learned the destination MAC address x and the common address ##T.

The node device ##2D having received the RPR packet searches for an MAC table employing the MAC address X which is a destination address of the received RPR packet.

The redundant node device ##2D transmits the RPR packet to the redundant link 2 without flooding because the redundant node device ##2D has already learned the MAC address X in the MAC table. Then the redundant node device ##1D having received the RPR packet searches for the MAC table employing the MAC address X which is a destination address of the RPR packet.

The redundant node device ##1D has already learned the MAC address X in the MAC table, so that the MAC address ##1A indicating a node device on a destination ring is read out from the MAC table.

The redundant node device ##1D transmits the destination MAC address of the RPR packet as the node device ##1A to the ring without flooding. The RPR packet transmitted onto the ring is received by the client ##X via the node device ##1A without being received by other node on the ring, because the destination MAC address of the RPR packet is the node device ##1A.

As described above, in the fifth embodiment, even a redundant node device for spare use can avoid, by learning an RPR packet, a temporary increase of loading in the network caused by flooding due to unlearning of the RPR packet after switching a redundant node.

In a sixth embodiment of the present invention, by taking in an RPR packet and transmitting the RPR packet also on a route for spare use, a redundant node device for spare use or a redundant link for spare use actually transmits the RPR packet, and an MAC table is made to carry out an automatic learning in a redundant node device for spare use.

Figure 25:
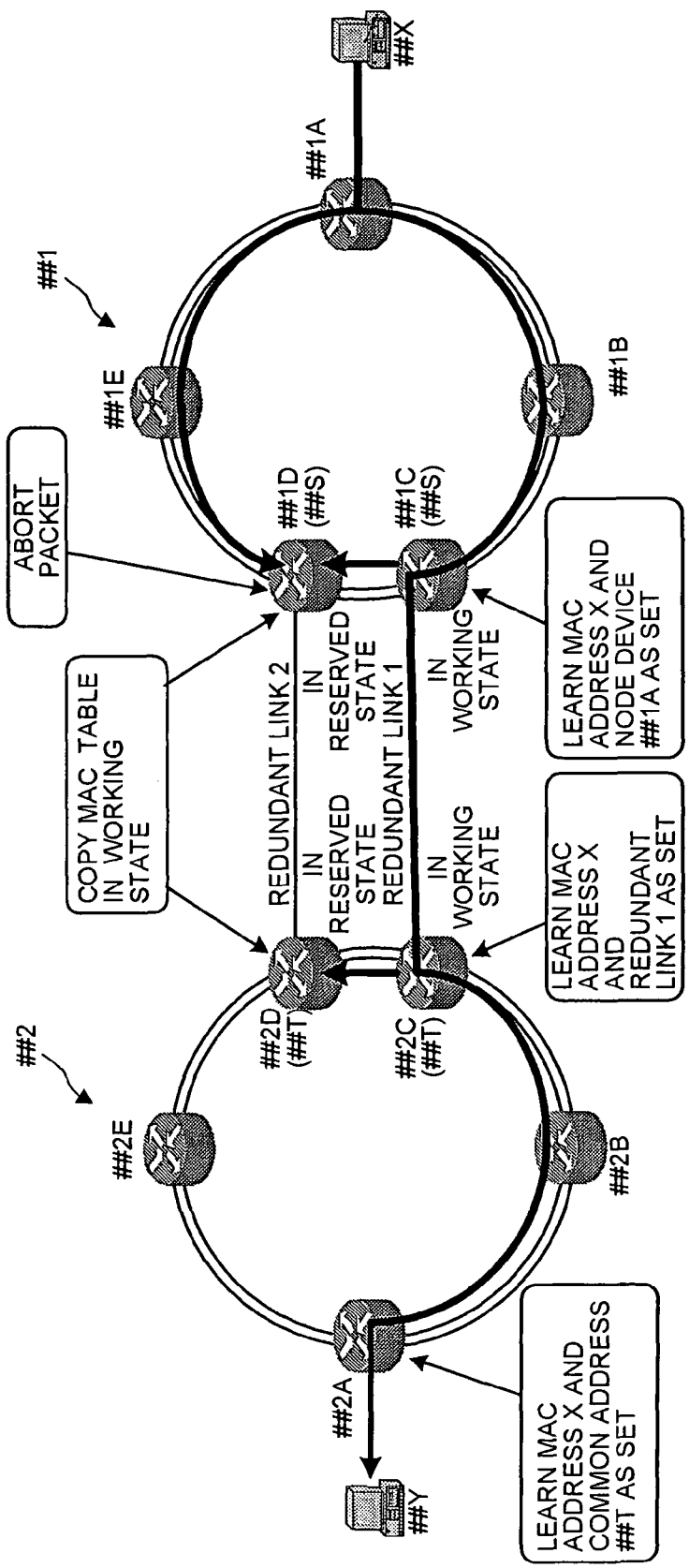
FIG. 25 is a schematic of operations in a sixth embodiment of the present invention.

In the sixth embodiment, a redundant node device for spare use aborts a received RPR packet as is the case in the first embodiment. However, in a case where a redundant node device for spare use performs packet transmission from the client ##X to the client ##Y as shown in FIG. 25, the redundant node device ##1D (##2D) for spare use receives contents of an MAC table from the redundant node device ##1C (##2C) for current use with a control RPR packet (not shown), and prepares an MAC table for the node of its own based on the same contents as that in the MAC table for current use. Namely, the MAC table of the redundant node device ##1C (##2C) for current use is copied to the redundant node device ##1D (##2D) for spare use.

Figure 26:
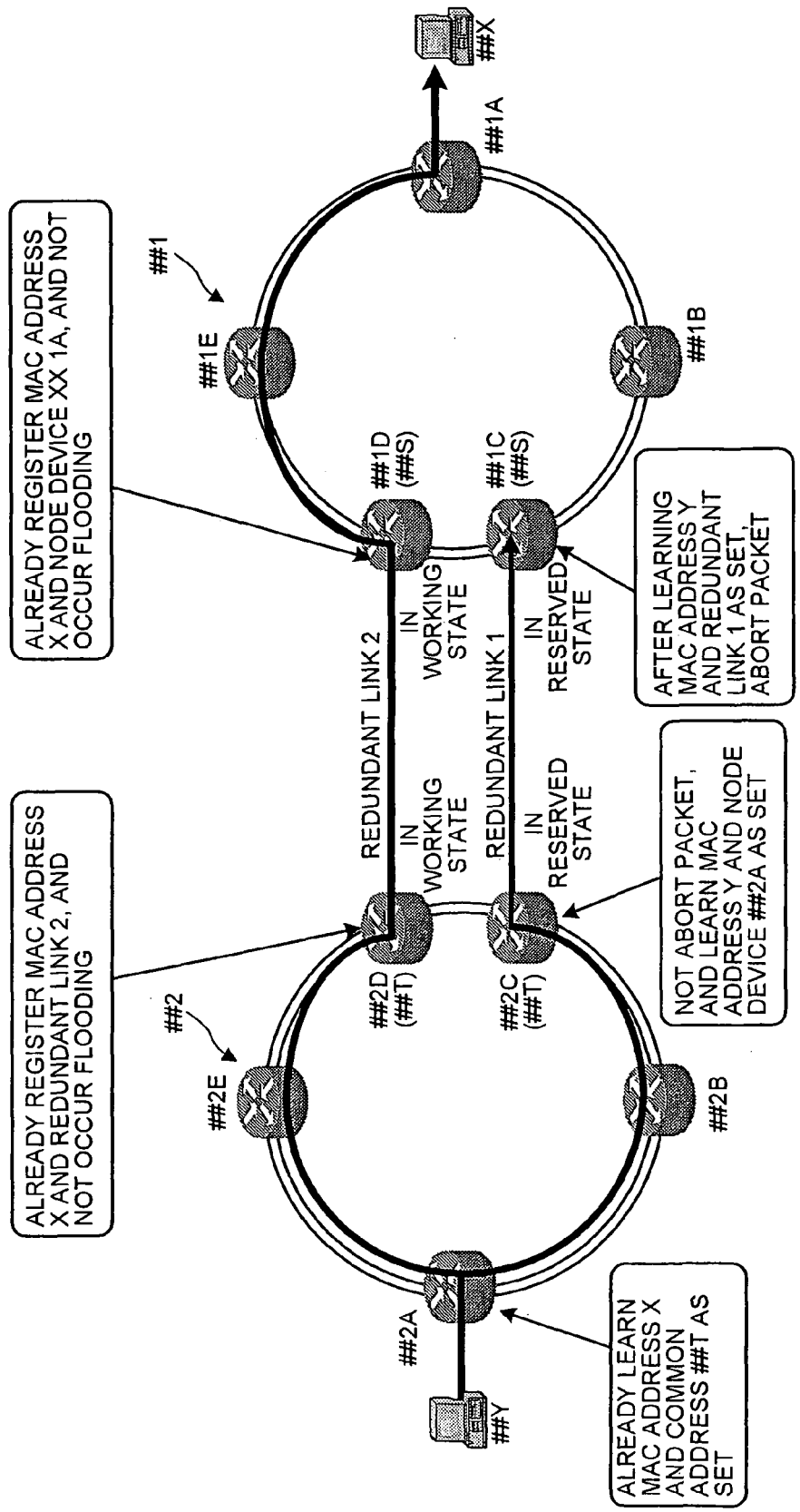
FIG. 26 is a schematic of operations in the sixth embodiment.

With the operation described above, as shown in FIG. 26, occurrence of flooding due to unlearning of the MAC address can be avoided in a new node device for current use after switching a redundant node.

Routes for transmission of an RPR packet are different before and after switching of the redundant node, and therefore there occur the problems of dual reception of an RPR packet or reversion of order. To overcome the problems as described above, in the seventh embodiment according to the present invention, a redundant node device checks a source ring path for a received RPR packet and a TTL value thereof. Further, a timer for aborting an RPR packet is provided. A default timer value is set as a preset parameter in each node.

Figure 27:
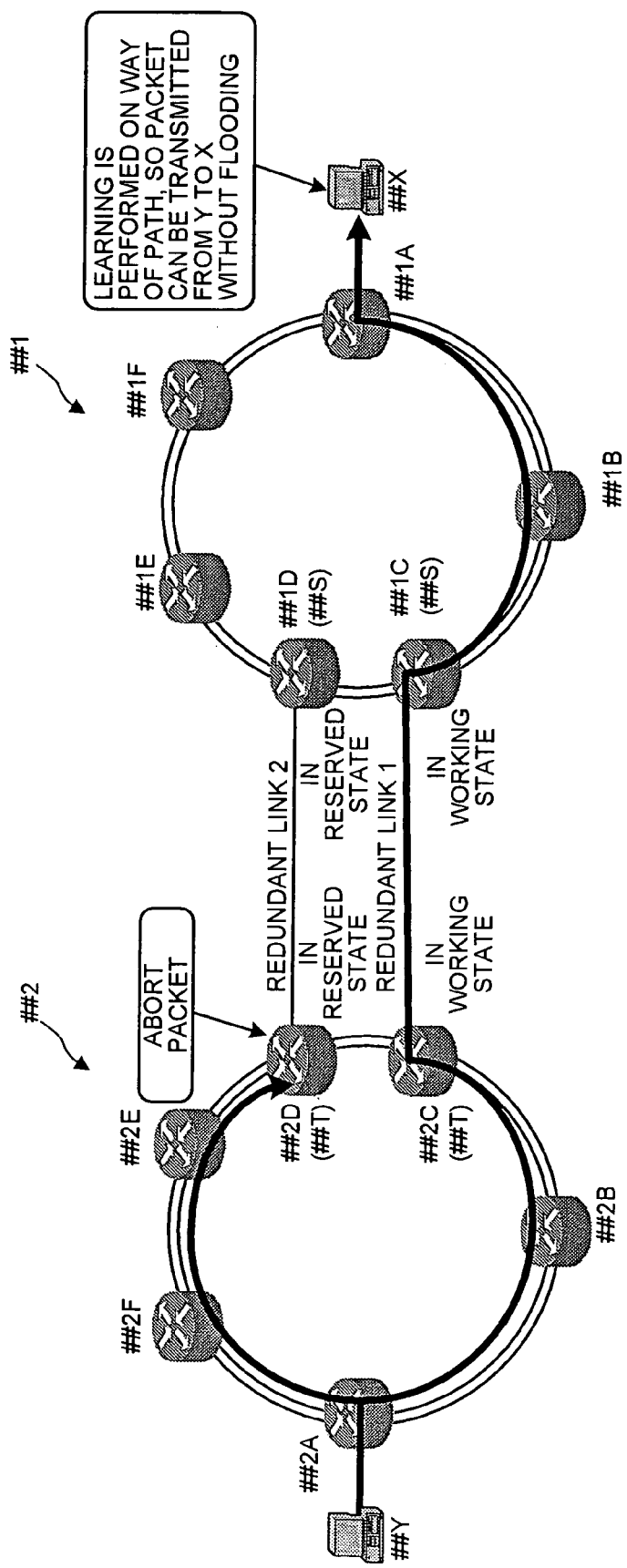
FIG. 27 is a schematic of operations in a seventh embodiment of the present invention.
Figure 28:
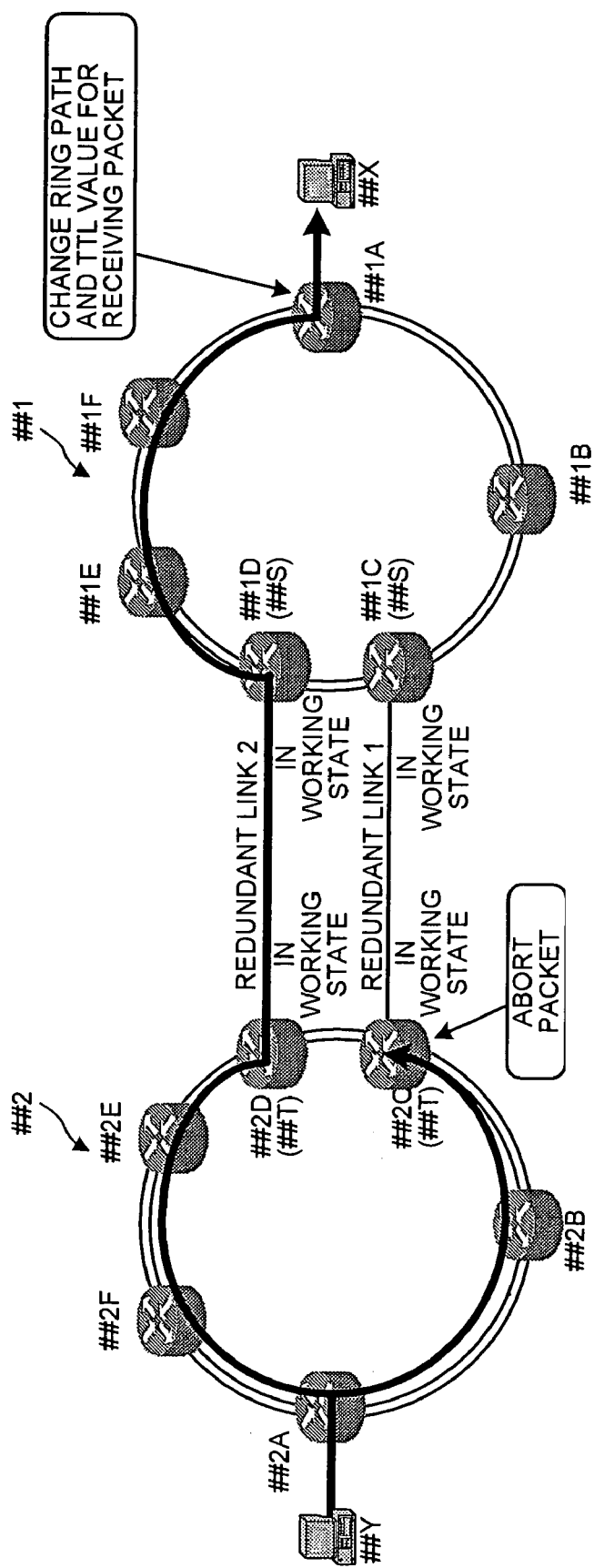
FIG. 28 is a schematic of operations in the seventh embodiment.

A transmission route for an RPR packet before switching of the redundant node shown in FIG. 27 is naturally different from that after switching of the redundant node shown in FIG. 28. Because of this feature, a dual reception of an RPR packet or reversion of order transitionally occurs before and after switching of the redundant node.

In FIG. 27, an RPR packet is transferred from a client ##Y to a client ##X through the 6 redundant node devices and node devices in all, namely from the node device ##2A to ##2B to ##2C to ##1c to ##1B and then to ##1A.

In FIG. 28, an RPR packet is transferred from a client ##Y to a client ##X through the 8 redundant node devices and node devices in all, namely, from the node device ##2A to ##2F to ##2E to the redundant node device ##2D to the redundant node device ##1D to the node device ##1E to ##1F and then to ##1A.

When there are many nodes after switching, a delay in RPR packet transfer simply increases as compared to a case where there is only a few nodes after switching.

When the client ##Y transmits an RPR packet before switching of a redundant node, when an RPR packet is transmitted from the redundant node device ##1C to the RPR network ##1 and switching of the redundant node is performed, or when an RPR packet transmitted from the node device ##2A to the redundant node device ##2D is still present on the RPR network ##2, the RPR packet again arrives at the client ##X through a new route after switching, so that the client ##X receives the RPR packet dually.

To overcome this problem, in a seventh embodiment, a timer is provided for each of nodes on the ring, and each node checks a source MAC address of an RPR packet received from the ring, and when the address is a common address for redundant nodes, each node checks the route ring path and the TTL value.

After switching of the redundant node, the source ring path or the TTL value changes, and when the change is detected, counting by the timer is started, and RPR packets each having the common address are aborted until a present period of time is over.

As described above, by providing a period of time for rejecting reception of an RPR packet immediately after switching, dual reception of an RPR packet before and after node switching can be prevented.

In an eighth embodiment, immediately after node switching, a redundant node set anew in the working state transfers a timer start control RPR packet for starting a time to the ring in the broadcast mode. In this step, a common address for redundant nodes is stored at the source MAC address of the RPR packet which is a timer, start control RPR packet.

Each node and each redundant node having received this timer start control RPR packet on the ring checks the source MAC address at a header of the RPR packet, and instructs the timer for common address in the node to start counting up. Then the each node and each redundant node abort received RPR packets having the same source MAC address as the enabled common address until a prespecified period of time for the timer is over.

FIG. 29 is a state transition diagram in the eighth embodiment. FIG. 29 is different from FIG. 8 in the point that the pre-working state (state just before working) is added. The pre-working state is effected before state transition from the reserved state to the working state, and a redundant node transmits a timer start control RPR packet during transition to this pre-working state.

The timer start control RPR packet is required to be received by each node and each redundant node after going around the ring, and therefore a redundant node checks reception of the timer start control RPR packet transmitted from the node. In this step, the redundant node starts a timer for receiving a packet.

The preset time for the timer is sufficient for a timer start control RPR packet to go around the ring. When the timer start control RPR packet transmitted from the node is not received before the preset period of time is over, it is regarded that the timer start control RPR packet has been lost on the ring, and the node again transmits the timer start control RPR packet to the ring in the broadcast mode, starts the timer for the timer start control RPR packet again, and checks reception of the timer start control RPR packet transmitted from the node itself.

A value of N is set in the redundant node so that the operations described above are repeated at most N times. When the timer start control RPR packet transmitted from the node is not received even after the operations are repeated N times, the node is set in the reserved state. When the node receives the timer start control RPR packet before time out of the timer, the state of the node is shifted to the working state.

In a ninth embodiment according to the present invention, as shown in FIG. 30, transmission of an RPR packet on the ring and to a redundant link is stopped immediately after switching of the redundant node and until a preset period of time set for the timer in the redundant node set anew in the working state is over, and abortion of transmitted RPR packet is carried out.

In other words, in the ninth embodiment, a timer for counting clocks during shift from the pre-working state to the working state is provided anew. This time value for shifting to this working state is set as a preset parameter in the default state of the device.

A redundant node activates this timer for shifting to the working state when shifting from the reserved state to the pre-working state. When the preset time for the timer is up, the redundant node shifts to the working state. In the pre-working state, the redundant node preserves the blocking state in which transmission of a data RPR packet to redundant links and to the ring is suspended, aborts the data RPR packets to be transmitted, and transmits the data RPR packet to the redundant link and to the ring only after shifting to the working state.

In the seventh and eighth embodiments, abortion of a received RPR packet is transitionally carried out after redundant node switching in the receiving side of the ring node, but in the ninth embodiment, abortion of a transmitted RPR packet is carried out in the redundant node shifting to the working state.

In a tenth embodiment according to the present invention, a mechanism for forcefully switching a state of a redundant node is provided anew. In testing or assessment, or when a network is run, sometimes a state of a redundant node is forcefully shifted from the working state to the reserved state or from the reserved state to the working state.

In the tenth embodiment, by inputting a command for forcefully switching a state of the redundancy node from an input/output section of a device, a state of the redundancy node can be switched.

As shown in FIG. 31, detection of a request for switching command to the reserved state is included anew as a condition for shifting from the working state to the reserved state. Further, detection of a request for switching to the pre-working state us included as a condition for shifting from the reserved state to the pre-working state.

As a result, a state of a redundant node can forcefully be switched by inputting a command for forceful switching from an input/output section of the device, and therefore testing or assessment of a switching function can efficiently be carried out.

In an eleventh embodiment according to the present invention, as shown in FIG. 32, an item redundant node status is provided anew in the ring topology table shown in FIG. 17. In other words, in the eleventh embodiment, a redundant status of a keep-alive RPR packet issued from a redundant node device is reflected to a topology table in each ring node, so that an operator can read out necessary data from this topology table according to the necessity.

As a result, an operator can identify a redundant node on the ring and grasp the current state of the redundant node to monitor erroneous setting of the redundant node or abnormal state of the redundant node.

Figure 33:
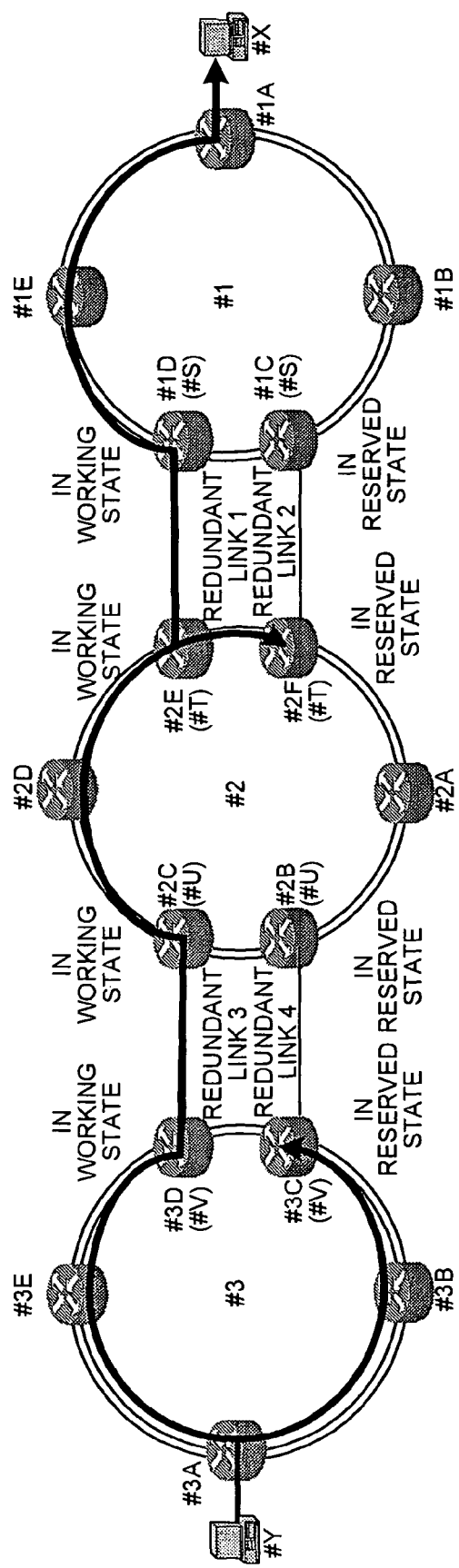
FIG. 33 is a view illustrating a twelfth embodiment according to the present invention.

In a twelfth embodiment according to the present invention, RPR networks #1, #2, #3 are present on a network as shown in FIG. 33 (a view illustrating operations before switching). In the RPR network #1 and RPR network #2, a redundant node device #1D and a redundant node device #2E are connected to each other via the redundant link 1, and are used as working networks respectively. The redundant node device #1C and a redundant node device #2F are connected to each other via the redundant link 2, and are used as reserved networks respectively.

In the RPR network #2 and RPR network #3, a redundant node device #2C and a redundant node device #3D are connected via the redundant link 3 and are used as working networks respectively. A redundant node device #2B and a redundant node device #3C are connected via the redundant link 4 and are used as reserved networks respectively.

Figure 34:
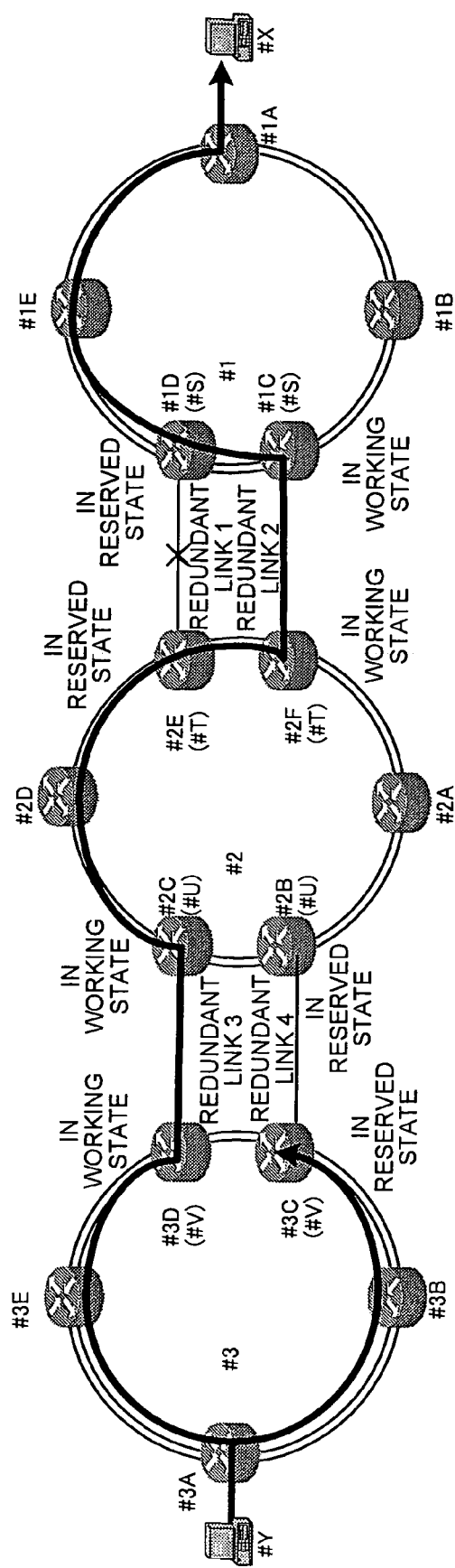
FIG. 34 is a view illustrating a twelfth embodiment according to the present invention.
Figure 35:
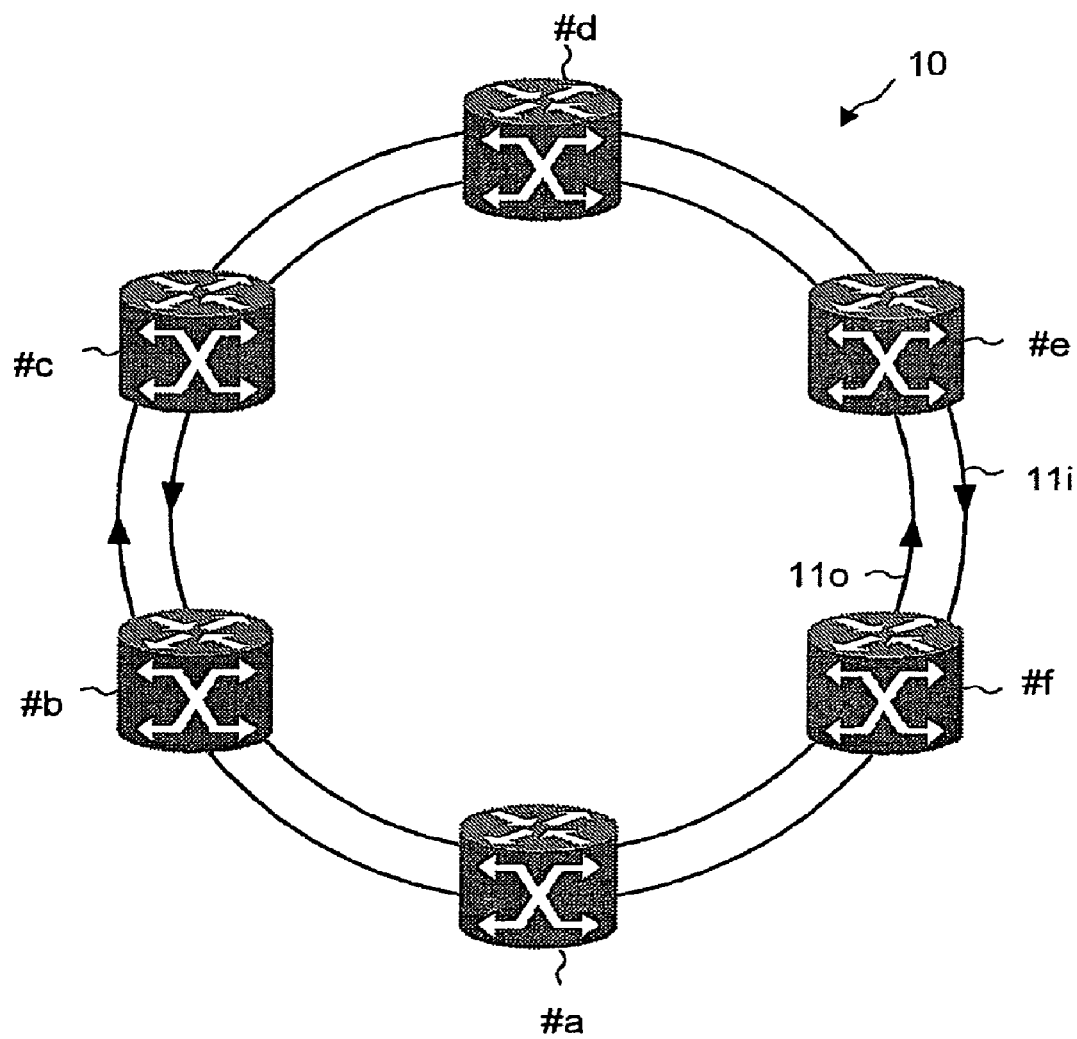
FIG. 35 is a block diagram illustrating configuration of a conventional RPR network 10.

FIG. 34 is a schematic of operations after switching of a redundant node due to occurrence of a trouble in the redundant link 1. In FIG. 34, the redundant link 2 between the redundant node device #1C and redundant node device #2F is a working link.

In this case, switching of a redundant node between the RPR network #2 and RPR network #3 are not executed.

As described above, in the twelfth embodiment, a node redundancy function is added anew as an RPR function, and therefore in a network requiring node redundancy, network resources such as fibers can efficiently be used to switch a redundant node at a high speed, and further an RPR node redundancy function with high versatility can be installed, which largely contributes to improvement of the reliability of a network.

The first to twelfth embodiments of the present invention are described above with reference to the related drawings, but the present invention is not limited to the specific configurations in the first to twelfth embodiments, and design changes within a gist of the present invention are included in the present invention.

For instance, in the first embodiment, a program for realizing each of the functions described above may be recorded in a computer-readable recording medium. In this case the program recorded in the recording medium is read out and executed by a computer for realizing each function.

A computer includes a CPU for executing the program as described above, input devices such as a keyboard and a mouse, a ROM (Read Only Memory) for storing therein various types of data, a RAM (Random Access Memory) for storing therein parameters for computing and the like, a reader for reading out a program from a recording medium, output devices such as a display unit and a printer, and a bus connecting the components described above to each other.

The CPU reads out a program recorded in a recording medium via a reader and realizes each of the functions as described above by executing the program. The recording medium available for the purpose described above includes an optical disk, a flexible disk, a hard disk, and the like.

In the present invention, also the configuration is allowable in which node redundancy switching is forcefully executed according to a command inputted from an input/output section.

Further in the present invention, the configuration is allowable in which a message packet distributed from a redundant node has a field indicating whether the node is in the working state or in the reserved state and each node having received the message packet reflects the data indicating whether the node is in the working state or in the reserved state to the ring topology table for enabling an operator to monitor a sate of the redundant node.

In the present invention, the configuration is allowable in which a packet transmitted from a redundancy group includes, in addition to the common address stored in the source address field of the packet, information indicating from which redundant node in the redundancy group the packet is transmitted for enabling collection of statistic information for a number of received packets.

In the present invention, the configuration is allowable in which, when an RPR packet is received from a redundancy group, from which redundant node the RPR packet is transmitted is determined for enabling counting and display of received packets for statistic analysis.

When data for received packets is collected for each node for statistic analysis, a node transmitting an RPR packet is identified based on a source address of the RPR packet.

When an RPR packet is transmitted from a redundant node, the source address is a common address, and therefore it is possible to recognize that the RPR packet was transmitted from a redundant node, but from which redundant node the RPR packet was transmitted can not be determined in the system as described above. In this case, for instance, if a node in the reserved state erroneously transmits an RPR packet due to a trouble or the like, a communication trouble occurs between terminal devices, and correct information can not be acquired from the statistic information on the RPR packet ring.

Further in the present invention, also the configuration is allowable in which a TTL value Base of the RPR packet format is reflected to statistic information for received RPR packets. A default TTL value is stored in the TTL value Base. The TTL value Base is not decremented each time a packet passes through a ring node and is received by each node with the value unchanged.

With this functional configuration, a number of hops up to the source node can be computed by subtracting the TTL value from the TTL value Base in each received RPR packet. It is possible to recognize which node the source address indicates from the value as well as from the ring topology table.

Further it is possible to collect and display information for RPR packets having a common node and received from each source node. In this case, it is possible to collect data concerning a number of RPR packets received from nodes in the reserved state which should not have transmitted the RPR packets, which enables improvement of the monitoring function for a ring network with redundant nodes provided thereon.

In the present invention, also the configuration is allowable in which, when each node receives an RPR packet from a redundant node, the node checks whether the RPR packet has been transmitted from a node in the working state or from a node in the reserved state, and the received RPR packets transmitted from nodes in the reserved state are forcefully aborted after statistic information is collected.

With the functional configuration, it is possible to forcefully abort RPR packets transmitted from nodes in the reserved state by using the standard RPR packet format without the needs for especially adding, to each RPR packet, data indicating whether the RPR packet is transmitted from a node in the working state or from a node in the reserved state, a source redundant node address, and the like.

Generally, a node in the reserved state does not transmit an RPR packet, but when a trouble occurs in a node in the reserved state, or upon occurrence of a trouble with the low probability such as, for instance, successive transmission of RPR packets after a state of a redundant node is switched from the working state to the reserved state, by forcefully aborting in the receiving side the RPR packets transmitted from the node in the reserved state, it is possible to further improve the reliability of a ring network with redundant nodes provided thereon.

In the present invention, when information on a route up to a specified node is to be checked, when normality of the route is to be checked, or when a redundant node is present on a way of the route, by storing a discrete address as route information in the OAM packet or the like in place of the common address, the route can clearly be indicated.

For instance, in FIG. 20, when a command of TraceRoute or the like is issued from the client ##Y to the client ##X, it is possible to return accurate route information in response to the command by returning discrete addresses of the redundant node device ##2C and redundant node device ##2D in place of the common address #T.

As described above, the node redundancy configuration according to the present invention provides the advantage that a number of fibers in a network as a whole can be reduced and high speed node switching can be carried out.

As described above, the node redundancy method, interface face, interface device, node device, and packet ring network system according to the present invention is effective for node redundancy switching.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A node redundancy method applied to a packet ring network having a plurality of nodes and a plurality of redundant nodes, the redundant nodes including a first redundant node and at least one second redundant node, comprising:
   the first redundant node setting in a message packet a common address and setting information, and broadcast-transmitting the message packet over the packet ring network, wherein the common address is an address that is commonly used with the second redundant node, and setting information is information indicative of the fact that the first redundant node is a redundant node;
   the second redundant node receiving the message packet and setting in a ring topology table existence information and the common address, wherein the existence information is information indicative of existence of the first redundant node in the packet ring network; and
   a node from among the nodes, when receiving a packet destined to a redundant node, setting the common address as a destination address in the packet and transmitting the packet to the packet ring network.

2. The node redundancy method according to claim 1, wherein the each node on the packet ring network executing:
   grasping a position of the first redundant node in the packet ring network from the ring topology table;
   calculating number of hops starting from the sending redundant node to a redundant node of the redundant nodes located farthest from the sending redundant node along an inner route and an outer route in the packet ring network;
   selecting a route out of the inner route and the outer route with smaller number of hops calculated at the calculating; and
   setting information indicative of the number of hops corresponding to the route selected at the selecting in a header of the packet to thereby selecting the route as a shortest route to the first redundant node.

3. The node redundancy method according to claim 1, wherein the each node on the packet ring network executing:
   grasping a position of the first redundant node in the packet ring network from the ring topology table;
   calculating number of hops starting from the sending redundant node to a redundant node of the redundant nodes located farthest from the sending redundant node along an inner route and an outer route in the packet ring network; and
   setting information indicative of the number of hops corresponding to both the inner route and outer route in a header of the packet and sending the packet through both the inner route and the outer route.

4. The node redundancy method according to claim 1 further comprising:
   calculating positional relationship between a target redundant node and each of other redundant nodes; and
   selecting a forwarding state based on the positional relationship.

5. The node redundancy method according to claim 1, further comprising:
   setting a plurality of different common addresses on the packet ring network; and
   setting a different common addresses to each of the redundant nodes other than the first redundant node, adding a redundant group ID field to the message packet delivered by the first redundant node, and managing each redundant group with the redundant group ID.

6. The node redundancy method according to claim 1, further comprising:
   setting information data concerning a plurality of redundant groups in the message packet delivered by the first redundant node.

7. The node redundancy method according to claim 1 further comprising:
   setting, by a redundant node in a backup system, information data concerning a transmitter address for a received packet in a packet transmission management table; and
   a redundant node, which has newly shifted into an active system due to redundant node switching, setting a packet according to contents registered in the packet transmission management table during an operation of the backup system.

8. The node redundancy method according to claim 1, further comprising:
   copying a packet transmission management table created based on information concerning a transmitter address when a redundant node in an active system receives a packet, onto a redundant node in a backup system; and
   transmitting a packet according to the packet transmission management table copied from a node in the older active system.

9. The node redundancy method according to claim 1, further comprising:
   checking a transmitter ring route and a TTL value for a packet received from the first redundant node in each node of the redundant nodes other than the first redundant node; and
   discarding, when a change in the TTL value is detected, the packet during a preset time counted by a timer.

10. The node redundancy method according to claim 1, further comprising:
    broadcast-transmitting, immediately after switching a redundant node, by a redundant node newly entering in an active system, a control packet indicating switching of the redundant node on the packet ring network; and
    discarding a packet having a common address indicated by the control packet as a transmitter address from the time when each node having received the control packet starts up a timer set in the node itself until a timeout of the timer.

11. The node redundancy method according to claim 1, further comprising:
    stopping, immediately after switching a redundant node, transmission of a packet to the packet ring network from the time when a redundant node newly entering into an active system starts up a timer set in the node itself until a timeout of the timer to discard transmitted packet.

12. The node redundancy method according to claim 1, further comprising:
forcedly switching node redundancy according to a command inputted from an input/output section.

13. The node redundancy method according to claim 1, further comprising:
reflecting, by each node having a field indicating an active or backup state of the node itself in the message packet delivered by the first redundant node and receiving the message packet, the active or backup state of the redundant node on a ring topology table so that an operator can monitor a state of the redundant node.

14. The node redundancy method according to claim 1, further comprising:
determining, in a packet transmitted from a given redundant group, when each node receives a packet, from which redundant node in a given redundant group is transmitted the packet, other than information concerning a common address stored in a transmitter address field of the packet to aggregate statistical information concerning the number of received packets.

15. The node redundancy method according to claim 1, further comprising:
checking, when each node receives a packet from a redundant node, a transmitter node of the packet is whether in an active system or a backup system; and
forcedly discarding a packet received from a backup system and for indicating a warning of receipt of a packet from the backup system.

16. The node redundancy method according to claim 1, wherein, when transmitting an OAM packet to confirm normality of a route reaching a prespecified node, in a case where information concerning a node address indicating the route reaching a prespecified node is set in the OAM packet, a redundant node sets a discrete address instead of the common address.

17. The node redundancy method according to claim 1, wherein a control packet for a packet is applied to a packet format in which each redundant node broadcast-transfers a redundant node state of the node itself to each node on the packet ring network, while the TLV format is employed for a format for storing information concerning a redundant node.

18. A node device provided on a packet ring network including a plurality of nodes and at least one redundant node, comprising:
a setting unit that receives a message packet with a common address and information concerning a redundant node setting and sets information in a ring topology table indicative of existence of a redundant node and the common address, the common address and the redundant node setting being set in the message packet by the redundant node, the message packet being broadcasted to the packet ring network by the redundant node, the common address being commonly used with other redundant node on the packet ring network, the redundant node setting being indicating that a node itself is set as a redundant node; and
a transmitting unit that sets the common address as a destination address of the packet when a packet addressed to a redundant node is transmitted and transmits the packet to the packet ring network.

19. A packet ring network system with a redundant node provided thereon comprising:
a first transmitting unit that sets, by a node provided as a redundant node, a common address commonly used with other redundant node on the packet ring network and information concerning redundant node setting indicating that a node itself is set as a redundant node, and broadcasts the message packet to the packet ring network;
a setting unit that sets, by each node on the packet ring network having received the message packet, existence of a redundant node on a ring topology table within the node itself and the common address; and
a second transmitting unit that sets the common address as an address of a packet addressed to a redundant node and transmits the packet to the packet ring network.

* * * * *